US011455339B1

(12) United States Patent
Ericson et al.

(10) Patent No.: US 11,455,339 B1
(45) Date of Patent: *Sep. 27, 2022

(54) INCREMENTAL UPDATES TO NATURAL LANGUAGE EXPRESSIONS IN A DATA VISUALIZATION USER INTERFACE

(71) Applicant: Tableau Software, LLC, Seattle, WA (US)

(72) Inventors: Jeffrey Ericson, Menlo Park, CA (US); Vidya Raghavan Setlur, Portola Valley, CA (US); Alex Djalali, Los Gatos, CA (US); Sanaz Golbabaei, Palo Alto, CA (US); Theodore Kornish, Palo Alto, CA (US); Xin Zhao, Mountain View, CA (US); An Shi, Vancouver (CA); Christoph Sachse, Stanford, CA (US); Eliana Leite Goldner, Vancouver (CA); Suyang Duan, Vancouver (CA)

(73) Assignee: TABLEAU SOFTWARE, LLC, Seattle, WA (US)

(*) Notice: Subject to any disclaimer, the term of this patent is extended or adjusted under 35 U.S.C. 154(b) by 52 days.

This patent is subject to a terminal disclaimer.

(21) Appl. No.: 16/601,437

(22) Filed: Oct. 14, 2019

Related U.S. Application Data

(60) Provisional application No. 62/897,187, filed on Sep. 6, 2019.

(51) Int. Cl.
*G06F 16/9032* (2019.01)
*G06F 16/904* (2019.01)
*G06F 16/9038* (2019.01)

(52) U.S. Cl.
CPC ...... *G06F 16/90332* (2019.01); *G06F 16/904* (2019.01); *G06F 16/9038* (2019.01)

(58) Field of Classification Search
CPC ............. G06F 16/90332; G06F 16/904; G06F 16/9038
See application file for complete search history.

(56) References Cited

U.S. PATENT DOCUMENTS 7,019,749 B2 3/2006 Guo et al.
7,089,266 B2 8/2006 Stolte et al.
(Continued)

FOREIGN PATENT DOCUMENTS

WO WO2018/204696 A1 11/2018

OTHER PUBLICATIONS

Atallah, Final Office Action, U.S. Appl. No. 17/063,663, dated Jul. 19, 2021, 20 pgs.
(Continued)

*Primary Examiner* — Taelor Kim
(74) *Attorney, Agent, or Firm* — Morgan, Lewis & Bockius LLP

(57) ABSTRACT

A method is performed at a computing device that includes a display, one or more processors, and memory. The device displays a data visualization based on a dataset retrieved from a database. It also displays one or more phrases in a first region. The phrases define the data visualization. The device receives user input in a second region to specify a natural language command related to the displayed data visualization. In response to the user input, the device extracts independent analytic phrases from the command, determines one or more proposed actions based on the extracted phrases, and displays the proposed actions. The device receives user selection of a first proposed action. In response, the device generates an updated data visualization. It displays the updated data visualization and displays one or more updated phrases in the first region. The updated phrases define the updated data visualization.

20 Claims, 26 Drawing Sheets

(56) References Cited

U.S. PATENT DOCUMENTS

| | | |
|---|---|---|
| 7,391,421 B2 | 6/2008 | Guo et al. |
| 7,606,714 B2 | 10/2009 | Williams et al. |
| 7,716,173 B2 | 5/2010 | Stolte et al. |
| 8,321,465 B2 | 11/2012 | Farber et al. |
| 8,489,641 B1 | 7/2013 | Seefeld et al. |
| 8,713,072 B2 | 4/2014 | Stolte et al. |
| 8,972,457 B2 | 3/2015 | Stolte et al. |
| 9,183,235 B2 | 11/2015 | Stolte et al. |
| 9,244,971 B1 | 1/2016 | Kalki |
| 9,477,752 B1 | 10/2016 | Romano |
| 9,501,585 B1 | 11/2016 | Gautam et al. |
| 9,575,720 B2 | 2/2017 | Faaborg et al. |
| 9,794,613 B2 | 10/2017 | Jang et al. |
| 9,858,292 B1 | 1/2018 | Setlur et al. |
| 9,953,645 B2 | 4/2018 | Bak et al. |
| 2004/0030741 A1 | 2/2004 | Wolton et al. |
| 2004/0039564 A1 | 2/2004 | Mueller |
| 2004/0073565 A1 | 4/2004 | Kaufman et al. |
| 2004/0114258 A1 | 6/2004 | Harris, III et al. |
| 2005/0015364 A1 | 1/2005 | Gupta et al. |
| 2006/0021840 A1 | 2/2006 | Kimes et al. |
| 2006/0218140 A1 | 9/2006 | Whitney et al. |
| 2006/0259394 A1 | 11/2006 | Cushing et al. |
| 2006/0259775 A2 | 11/2006 | Oliphant |
| 2007/0174350 A1 | 7/2007 | Pell et al. |
| 2007/0179939 A1 | 8/2007 | O'Neil et al. |
| 2008/0046462 A1 | 2/2008 | Kaufman et al. |
| 2009/0171924 A1* | 7/2009 | Nash .................. G06F 16/3329 |
| 2009/0299990 A1 | 12/2009 | Setlur et al. |
| 2009/0313576 A1 | 12/2009 | Neumann et al. |
| 2010/0030552 A1 | 2/2010 | Chen et al. |
| 2010/0110076 A1 | 5/2010 | Hao et al. |
| 2010/0313164 A1 | 12/2010 | Louch et al. |
| 2011/0066972 A1 | 3/2011 | Sugiura |
| 2011/0191303 A1 | 8/2011 | Kaufman et al. |
| 2012/0047134 A1 | 2/2012 | Hansson et al. |
| 2012/0179713 A1 | 7/2012 | Stolte et al. |
| 2013/0031126 A1 | 1/2013 | Setlur |
| 2013/0055097 A1 | 2/2013 | Soroca et al. |
| 2014/0189548 A1 | 7/2014 | Werner |
| 2014/0192140 A1 | 7/2014 | Peevers et al. |
| 2015/0019216 A1 | 1/2015 | Singh et al. |
| 2015/0026153 A1 | 1/2015 | Gupta et al. |
| 2015/0026609 A1 | 1/2015 | Kim |
| 2015/0058318 A1 | 2/2015 | Blackwell et al. |
| 2015/0095365 A1 | 4/2015 | Enick et al. |
| 2015/0123999 A1 | 5/2015 | Ofstad et al. |
| 2015/0269175 A1 | 9/2015 | Espenshade et al. |
| 2015/0310855 A1 | 10/2015 | Bak et al. |
| 2015/0379989 A1 | 12/2015 | Balasubramanian et al. |
| 2016/0070451 A1 | 3/2016 | Kim et al. |
| 2016/0103886 A1 | 4/2016 | Prophete et al. |
| 2016/0188539 A1 | 6/2016 | Parker et al. |
| 2016/0261675 A1 | 9/2016 | Block et al. |
| 2016/0283588 A1 | 9/2016 | Katae |
| 2016/0335180 A1 | 11/2016 | Teodorescu et al. |
| 2016/0378725 A1* | 12/2016 | Marchsreiter ......... G06F 40/197 |
| | | 715/255 |
| 2017/0083615 A1 | 3/2017 | Boguraev et al. |
| 2017/0285931 A1 | 10/2017 | Duhon et al. |
| 2017/0357625 A1 | 12/2017 | Carpenter et al. |
| 2018/0108359 A9 | 4/2018 | Gunn et al. |
| 2018/0114190 A1 | 4/2018 | Borrel et al. |
| 2018/0121618 A1 | 5/2018 | Smith et al. |
| 2018/0181608 A1 | 6/2018 | Wu et al. |
| 2019/0034429 A1 | 1/2019 | Das et al. |
| 2019/0065456 A1 | 2/2019 | Platow |
| 2019/0205442 A1 | 7/2019 | Vasudev et al. |
| 2019/0362009 A1* | 11/2019 | Miseldine ........... G06F 21/6218 |
| 2020/0012638 A1 | 1/2020 | Lou et al. |
| 2020/0065769 A1 | 2/2020 | Gupta et al. |
| 2020/0089700 A1 | 3/2020 | Ericson et al. |
| 2020/0089760 A1 | 3/2020 | Ericson et al. |
| 2020/0097494 A1 | 3/2020 | Vertsel et al. |
| 2020/0274841 A1 | 8/2020 | Lee et al. |
| 2020/0293167 A1* | 9/2020 | Blyumen .............. G06F 16/243 |
| 2021/0042308 A1 | 2/2021 | Mustafi |
| 2021/0279805 A1 | 9/2021 | Elkan et al. |

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 pgs.

Androutsopoulos, I., Ritchie, G. D., and Thanisch, P. Natural language interfaces to databases—an introduction. Natural Language Engineering 1, Mar. 16, 1995, 50 pgs.

Atallah, Office Action, U.S. Appl. No. 17/063,663, dated Feb. 26, 2021, 19 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IFEE Transactions on Visualization & Computer Graphics (Proc. Info Vis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. TFEE Transactions on Knowledge and Data Engineering 6, 1 (1994), 12 pgs.

Ericson, Office Action, U.S. Appl. No. 16/680,431, dated Jan. 8, 2021, 18 pgs.

Ericson, Office Action, U.S. Appl. No. 16/680,431, dated May 19, 2021, 22 pgs.

Ericson, Office Action, U.S. Appl. No. 16/134,907, dated May 13, 2020, 9 pgs.

Ericson, Office Action, U.S. Appl. No. 16/134,907, dated Nov. 12, 2020, 10 pgs.

Ericson, Office Action, U.S. Appl. No. 16/134,892, May 15, 2020, 10 pgs.

Ericson, Final Office Action, U.S. Appl. No. 16/134,892, dated Nov. 24, 2020, 11 pgs.

Ericson, Notice of Allowance, U.S. Appl. No. 16/134,892, dated Mar. 9, 2021, 11 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for Geographical information systems. In Geographical Information Systems: Principles and Applications, vol. 1, D. Maguire, M, Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data visualization. In Proceedings of the 28th Annual ACM Symposium on User Interface Software Technology, UIST '15, ACM (New York, NY, USA, 2015), 12 pgs.

Grammel, L., Tory, M., and Storey, M. A. How information visualization novices construct visualizations. IEEE Transactions on Visualization and Computer Graphics 16, 6 (Nov. 2010), 10 pgs.

Hoque, Enamul et al., "Applying Pragmatics Principles for Interaction with Visual Analytics," IEEE Transaction of Visualization and Computer Graphics, IEEE Service Center, Los Alamitos, CA, vol. 24, No. 1, Jan. 1, 2018, 10 pgs.

IBM Watson Analytics. http://www.ibm.com/analytics/watson-analytics/, downloaded on May 9, 2017, 6 pgs.

Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.

(56) References Cited

OTHER PUBLICATIONS

Lawson, I-want-to-go moments: From search to store. https://www.thinkwithgoogle.com/articles/i-want-to-go-micro-moments.html, Apr. 2015, 7 pgs.
Li, F., and Jagadish, H. V. Constructing an interactive natural language interface for relational databases. Proc. VLDB Endow. 8, 1 (Sep. 2014), 12 pgs.
Microsoft Q & A. https://powerbi.microsoft.com/en-us/documentation/powerbi-service-q-and-a/, Mar. 14, 2017, 5 pgs.
Montello, D., Goodchild, M., Gottsegen, J., and Fohl, P. Where's downtown? behavioral methods for determining referents for vague spatial queries. Spatial Cognition and Computation 3, 2&3 (2003), 20 pgs.
NarrativeScience, Turn your data into better decisions with Quill, https://www.narrativescience.com/quill, downloaded on May 9, 2017, 12 pgs.
Ng, H. T., and Zelle, J. Corpus-based approaches to semantic interpretation in natural language processing, AI Magazine Winter 1997, (1997), 20 pgs.
Node.js®. https://nodejs.org/, downloaded on May 10, 2017, 1 pg.
Oviatt, S., and Cohen, P. Perceptual user interfaces: Multimodal interfaces that process what comes naturally. Commun. ACM 43, 3 (Mar. 2000), 9 pgs.
Parr, T. The Definitive ANTLR 4 Reference, 2nd ed.Pragmatic Bookshelf, 2013, 322 pgs.
Pedersen, T., Patwardhan, S., and Michelizzi, J. Wordnet::similarity: Measuring the relatedness of concepts. In Demonstration Papers at HLT-NAACL 2004, HLT-NAACL-Demonstrations '04, Association for Computational Linguistics (Stroudsburg, PA, USA, 2004), 2 pgs.
Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.
Pustejovsky, J., Castaño, J., Ingria, R., Saurí, R., Gaizauskas, R., Setzer, A., and Katz, G. Timeml: Robust specification of went and temporal expressions in text. In Fifth International Workshop on Computational Semantics (IWCS-5 (2003), 7 pgs.
Reinhart, T. Pragmatics and Linguistics: An Analysis of Sentence Topics. IU Linguistics Club publications. Reproduced by the Indiana University Linguistics Club, 1982, 5 pgs.
Setlur, Pre-Interview First Office Action dated Jul. 5, 2018, received in U.S. Appl. No. 15/486,265, 5 pgs.
Setlur, First Action Interview Office Action dated Aug. 29, 2018, received in U.S. Appl. No. 15/486,265, 6 pgs.
Setlur, Final Office Action dated Apr. 25, 2019, received in U.S. Appl. No. 15/486,265, 15 pgs.
Setlur, Notice of Allowance dated Sep. 6, 2019, received in U.S. Appl. No. 15/486,265, 13 pgs.
Setlur, Pre-Interview First Office Action dated Sep. 6, 2019, received in U.S. Appl. No. 15/804,991, 4 pgs.
Setlur, First Action Interview Office Action dated Oct. 29, 2019, received in U.S. Appl. No. 15/804,991, 6 pgs.
Setlur, Final Office Action, U.S. Appl. No. 15/804,991, dated Mar. 4, 2020, 14 pgs.
Setlur, Notice of Allowance, U.S. Appl. No. 15/804,991, dated Jul. 1, 2020, 15 pgs.
Setlur, Preinterview 1st Office Action, U.S. Appl. No. 15/978,062, dated Mar. 6, 2020, 4 pgs.
Setlur, Notice of Allowance, U.S. Appl. No. 15/978,062, dated May 29, 2020, 19 pgs.
Setlur, Office Action, U.S. Appl. No. 15/978,066, dated Mar. 18, 2020, 23 pgs.
Setlur, Final Office Action, U.S. Appl. No. 15/978,066, dated Aug. 19, 2020, 22 pgs.
Setlur, Office Action, U.S. Appl. No. 15/978,067, dated Feb. 21, 2020, 20 pgs.
Setlur, Final Office Action, U.S. Appl. No. 15/978,067, dated Aug. 5, 2020, 19 pgs.
Setlur et al., Eviza: A Natural Language Interface for Visual Analysis, ACM Oct. 16, 2016, 13 pgs.
Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.
Tableau, Communication Pursuant to Rules 161(1) and 162, EP18729514.2, dated Jun. 17, 2019, 3 pgs.
Tableau, Extended European Search Report, EP18729514.2, dated Mar. 4, 2020, 4 pgs.
Tableau Software, Inc., International Searh Report and Written Opinion, PCT/US2018/030959, dated Sep. 14, 2018, 13 pgs.
Tableau Software, Inc., International Preliminary Report on Patentability, PCT/US2018/030959, dated Nov. 5, 2019, 11 pgs.
Tableau Software Inc., International Search Report and Written Opinion, PCT/US2019/047892, dated Mar. 4, 2020, 24 pgs.
ThoughtSpot. Search-Driven Analytics for Humans, http://www.thoughtspot.com/, downloaded May 9, 2017, 9 pgs.
Turf: Advanced geospatial analysis for browsers and node, http://turfjs.org, downloaded May 9, 2017, 2 pgs.
Wikipedia, Extended Backus-Naur Form, https://en.wikipedia.org/wiki/Extended_Backus%E2%80%93Naur_Form, last edited on Jan. 7, 2017, 7 pgs.
Winograd, T. Procedures as a Representation for Data in a Computer Program for Understanding Natural Language. PhD thesis, Feb. 1971, 472 pgs.
WolframAlpha. Profesional-grade computational, https://www.wolframalpha.com/, downloaded May 9, 2017, 25 pgs.
Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.
Arnold et al., On Suggesting Phrases vs. Predicting Words for Mobile Text Composition, UIST, 2016, pp. 603-608 (Year: 2016).
Atallah, Notice of Allowance, U.S. Appl. No. 17/063,663, dated Dec. 22, 2021, 11 pgs.
Ericson, Office Action, U.S. Appl. No. 16/680,431, dated Nov. 10, 2021, 22 pgs.
Goldner, Office Action, U.S. Appl. No. 16/681,754, dated Mar. 2, 2022, 11 pgs.

* cited by examiner

```
┌─────────────────────────────────────────────────────────────┐
│  The one or more phrases includes one or more analytical concepts.  │── 866
└─────────────────────────────────────────────────────────────┘

┌─────────────────────────────────────────────────────────────┐
│  Determining that the one or more proposed actions include an add   │── 868
│  command and/or a replace command includes determining that the natural │
│  language command includes an analytical concept distinct from the one or │
│                    more analytical concepts.                │
│   ┌───────────────────────────────────────────────────┐     │
│   │ Each of the analytical concepts is selected from the group consisting │──── 870
│   │   of: field/measure, aggregation type, a level of detail of an        │
│   │      aggregation, filter, sort, and calculation over a time range.    │
│   └───────────────────────────────────────────────────┘     │
└─────────────────────────────────────────────────────────────┘
```

```
┌─────────────────────────────────────────────────────────────┐
│  A remove command specifies removing a predefined expression type.  │── 872
└─────────────────────────────────────────────────────────────┘

┌─────────────────────────────────────────────────────────────┐
│  The first proposed action includes removing phrases of the one or more │── 874
│            phrases containing the predefined expression type.           │
└─────────────────────────────────────────────────────────────┘

┌─────────────────────────────────────────────────────────────┐
│  Displaying the one or more updated phrases in the first region includes │── 876
│  removing from display all phrases of the one or more phrases that contain │
│                    the predefined expression type.                       │
└─────────────────────────────────────────────────────────────┘
```

878 — The replace command specifies replacement of an aggregation operator with a distinct aggregation operator.

880 — Displaying one or more proposed actions includes displaying an option that includes the aggregation operator and the distinct aggregation operator.

(G)

882 — The replace command specifies replacement of one field name with a distinct field name.

884 — Displaying one or more proposed actions include displaying an option that includes the one field name and the distinct field name.

(H)

886 — The add command specifies an operation on a third data field in the dataset. The third data field is distinct from the one or more first data fields.

888 — The first proposed action includes the add command.

890 — Displaying one or more updated phrases in the first region includes displaying with the one or more phrases an additional phrase that includes a third field name corresponding to the third data field.

Figure 8F

INCREMENTAL UPDATES TO NATURAL LANGUAGE EXPRESSIONS IN A DATA VISUALIZATION USER INTERFACE

RELATED APPLICATIONS

This application claims priority to U.S. Provisional Application Ser. No. 62/897,187, filed Sep. 6, 2019, entitled "Interface Defaults for Vague Modifiers in Natural Language Interfaces for Visual Analysis," which is incorporated by reference herein in its entirety.

This application is related to the following applications, each of which is incorporated by reference herein in its entirety: (i) U.S. patent application Ser. No. 15/486,265, filed Apr. 12, 2017, entitled "Systems and Methods of Using Natural Language Processing for Visual Analysis of a Data Set"; (ii) U.S. patent application Ser. No. 15/804,991, filed Nov. 6, 2017, entitled "Systems and Methods of Using Natural Language Processing for Visual Analysis of a Data Set"; (iii) U.S. patent application Ser. No. 15/978,062, filed May 11, 2018, entitled "Applying Natural Language Pragmatics in a Data Visualization User Interface"; (iv) U.S. patent application Ser. No. 16/219,406, filed Dec. 13, 2018, entitled "Identifying Intent in Visual Analytical Conversations"; (v) U.S. patent application Ser. No. 16/134,892, filed Sep. 18, 2018, entitled "Analyzing Natural Language Expressions in a Data Visualization User Interface"; (vi) U.S. patent application Ser. No. 15/978,066, filed May 11, 2018, entitled "Data Visualization User Interface Using Cohesion of Sequential Natural Language Commands"; (vii) U.S. patent application Ser. No. 15/978,067, filed May 11, 2018, entitled "Updating Displayed Data Visualizations According to Identified Conversation Centers in Natural Language Commands"; (viii) U.S. patent application Ser. No. 16/166,125, filed Oct. 21, 2018, entitled "Determining Levels of Detail for Data Visualizations Using Natural Language Constructs"; (ix) U.S. patent application Ser. No. 16/134,907, filed Sep. 18, 2018, entitled "Natural Language Interface for Building Data Visualizations, Including Cascading Edits to Filter Expressions"; and (x) U.S. patent application Ser. No. 16/234,470, filed Dec. 27, 2018, entitled "Analyzing Underspecified Natural Language Utterances in a Data Visualization User Interface".

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization applications that enable users to update existing data visualizations using sets of conversational operations. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method executes at a computing device that includes a display. The computing device includes one or more processors and memory. The memory stores one or more programs configured for execution by the one or more processors. The method displays a data visualization based on a dataset retrieved from a database. The method displays one or more phrases in a first region in proximity to the displayed data visualization. Each of the one or more phrases includes one or more first field names of data fields in the dataset. The one or more phrases define the data visualization. The method receives user input in a second region, distinct from the first region, to specify a natural language command related to the displayed data visualization. In response to the user input, the computing device extracts one or more independent analytic phrases from the natural language command. The computing device determines one or more proposed actions based on the extracted analytic phrases. The computing device displays the one or more proposed actions. The computing device receives user selection of a first proposed action of the one or more proposed actions. In response to the user selection, the computing device generates an updated data visualization. The computing device displays the updated data visualization, and displays one or more updated phrases in the first region. The one or more updated phrases include one or more second field names of data fields in the dataset. The one or more updated phrases define the updated data visualization.

In some implementations, the first field names and the second field names include a common field name.

In some implementations, the one or more first field names are displayed in a visually distinctive manner from other words included in the one or more phrases.

In some implementations, the one or more determined proposed actions include a remove command, an add command, and/or a replace command.

In some instances, the remove command specifies removing a field name from the one or more first field names. In some implementations, each of the one or more proposed actions is a proposed action to remove a phrase of the one or more phrases.

In some instances, the method displays each of the one or more proposed actions in a strikethrough format.

In some instances, the first proposed action specifies removing a first phrase of the one or more phrases. Displaying the one or more updated phrases in the first region includes not displaying the first phrase.

In some instances, the one or more phrases include one or more analytical concepts. Determining that the one or more proposed actions include an add command and/or a replace command includes determining that the natural language command includes an analytical concept distinct from the one or more analytical concepts.

In some instances, each of the analytical concepts is one of: a field/measure, an aggregation type, a level of detail of an aggregation, a filter, a sort, or a calculation over a time range.

In some instances, the remove command specifies removing a predefined expression type. The first proposed action specifies removing phrases of the one or more phrases containing the predefined expression type. Displaying the one or more updated phrases in the first region includes not displaying all of the phrases of the one or more phrases that contain the predefined expression type.

In some instances, the replace command specifies replacement of an aggregation operator with a distinct aggregation operator. Displaying the one or more proposed actions includes displaying an option that specifies replacement of the aggregation operator with the distinct aggregation operator.

In some instances, the replace command specifies replacement of one field name with a distinct field name. Displaying the one or more proposed actions include displaying an option that includes the one field name and the distinct field name.

In some implementations, generating the updated data visualization includes requerying the database using a set of one or more queries based on the extracted analytic phrases, thereby retrieving an updated dataset.

In some implementations, the user input is received as text input from a user in the second region.

In some implementations, the user input is received as a voice command using a microphone coupled to the computing device.

In some implementations, the one or more proposed actions are displayed as a drop-down menu from the second region.

In some implementations, the data visualization has a first data visualization type and the updated data visualization has a second data visualization type distinct from the first data visualization type.

In some instances, displaying the one or more proposed actions includes displaying a second proposed action that includes an add command, and includes displaying a third proposed action that includes a replace command.

In some implementations, the data visualization has a first data visualization type. Displaying an updated data visualization includes displaying a plurality of second data visualizations having the first data visualization type.

In some instances, the add command includes an operation on data fields with a third field name in the dataset. The third field name is distinct from the one or more first field names. The first proposed action includes the add command. Displaying one or more updated phrases in the first region includes displaying an additional phrase that includes the third field name, along with the one or more phrases.

In some implementations, the method ranks the one or more proposed actions based on one or more of: the closeness of match between the extracted analytical phrases and a canonical representation of an analytical expression; the frequency of usage of a field name based on previous user history; and the saliency or weight of a missing term that is inferred from the natural language command.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, refer to the Description of Implementations below, in conjunction with the following drawings, in which like reference numerals refer to corresponding parts throughout the figures.

FIGS. 8A-8F provide a flowchart of a method for updating visual analysis of datasets according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The various methods and devices disclosed in the present specification improve upon data visualization methods by performing conversational operations that update an existing data visualization. The conversational operations add, remove, and/or replace phrases that define an existing data visualization and create modified data visualizations. Such methods and devices improve user interaction with the natural language interface by providing quicker and easier incremental updates to natural language expressions in a data visualization.

Figure 1:
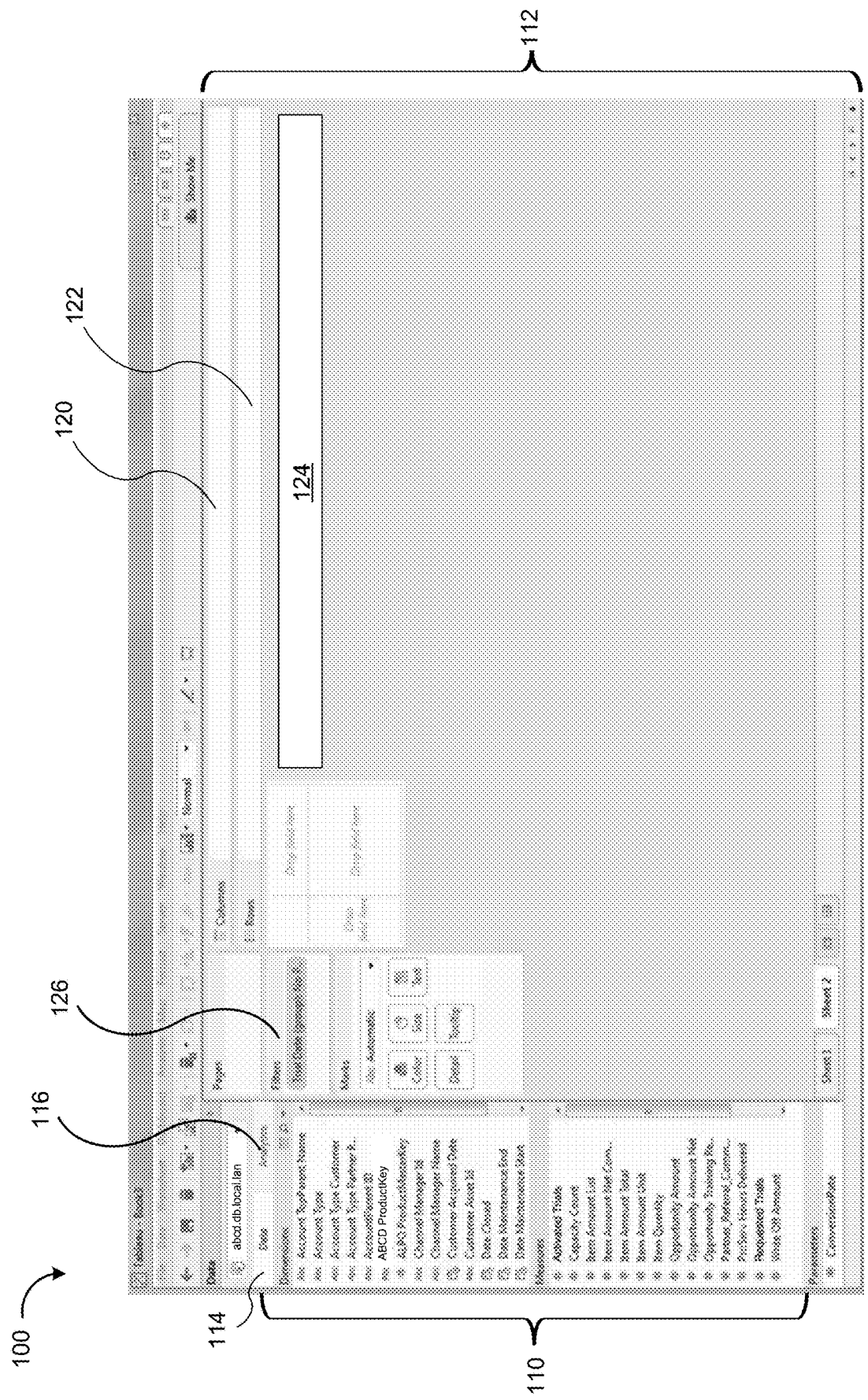
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2:
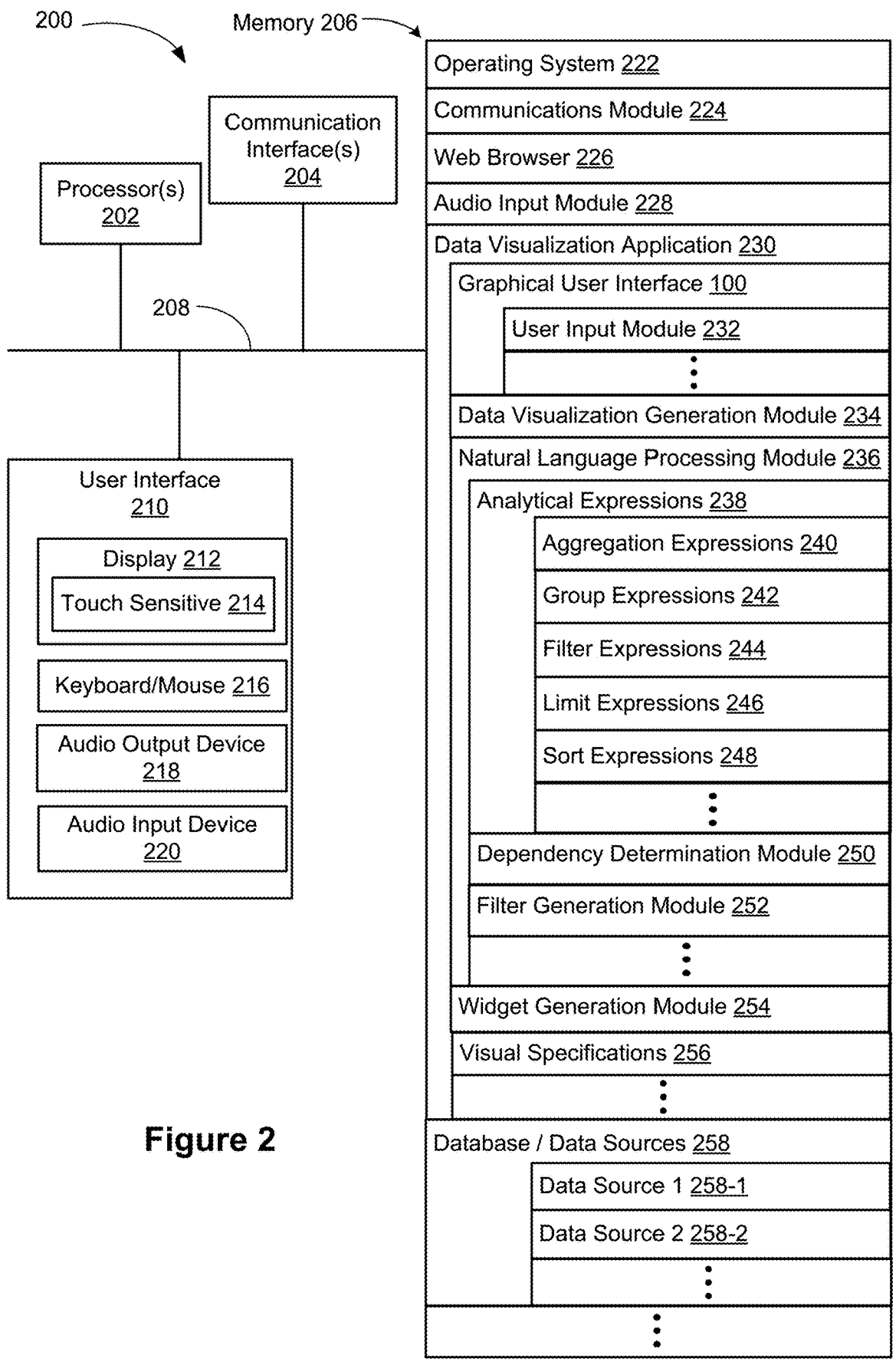
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language processing module 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;

a data visualization generation module 234, which automatically generates and displays a corresponding visual graphic (also referred to as a "data visualization" or a "data viz") using the user input (e.g., the natural language input);

a natural language processing module 236, which receives and parses the natural language input provided by the user. The natural language processing module 236 may identify analytical expressions 238, such as:

aggregation expressions 240. For example, "average Sales" is an aggregate expression that includes an aggregate term "average" and an attribute "Sales";

group expressions 242. For example, "by Region" is a group expression that includes a group term "by" and an attribute "Region";

filter expressions 244. For example, "Customer Name starts with John" is a filter expression that contains an attribute "Customer," a filter "starts with", and a value "John";

limit expressions 246. For example, "top 5 Wineries by sum of Sales" is a limit expression that contains a limit term "top", a value "5", a group by attribute "Wineries," and an aggregation expression "sum of Sales;" and sort expressions 248. For example, in "sort Products in ascending order by sum of Profit," the phrase "ascending order" is the sort term, "Products" is the attribute to group by, and "sum of Profit" is the aggregation expression;

The natural language processing module 236 may also include a dependency determination module 250, which looks up dependencies in a database 258 to determine how particular terms and/or phrases are related (e.g., dependent);

In some implementations, the natural language processing module 236 includes a filter generation module 252, which determines if one or more filters are related to a field that has been modified by a user. The filter generation module 252 generates the one or more filters based on a change to the field;

a widget generation module 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field;

visual specifications 256, which are used to define characteristics of a desired data visualization. In some implementations, the information the user provides (e.g., user input) is stored as a visual specification. In some implementations, the visual specifications 256 includes previous natural language commands received from a user or properties specified by the user through natural language commands. In some implementations, the visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and zero or more databases or data sources 258 (e.g., a first data source 258-1 and a second data source 258-2), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language processing module 236) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
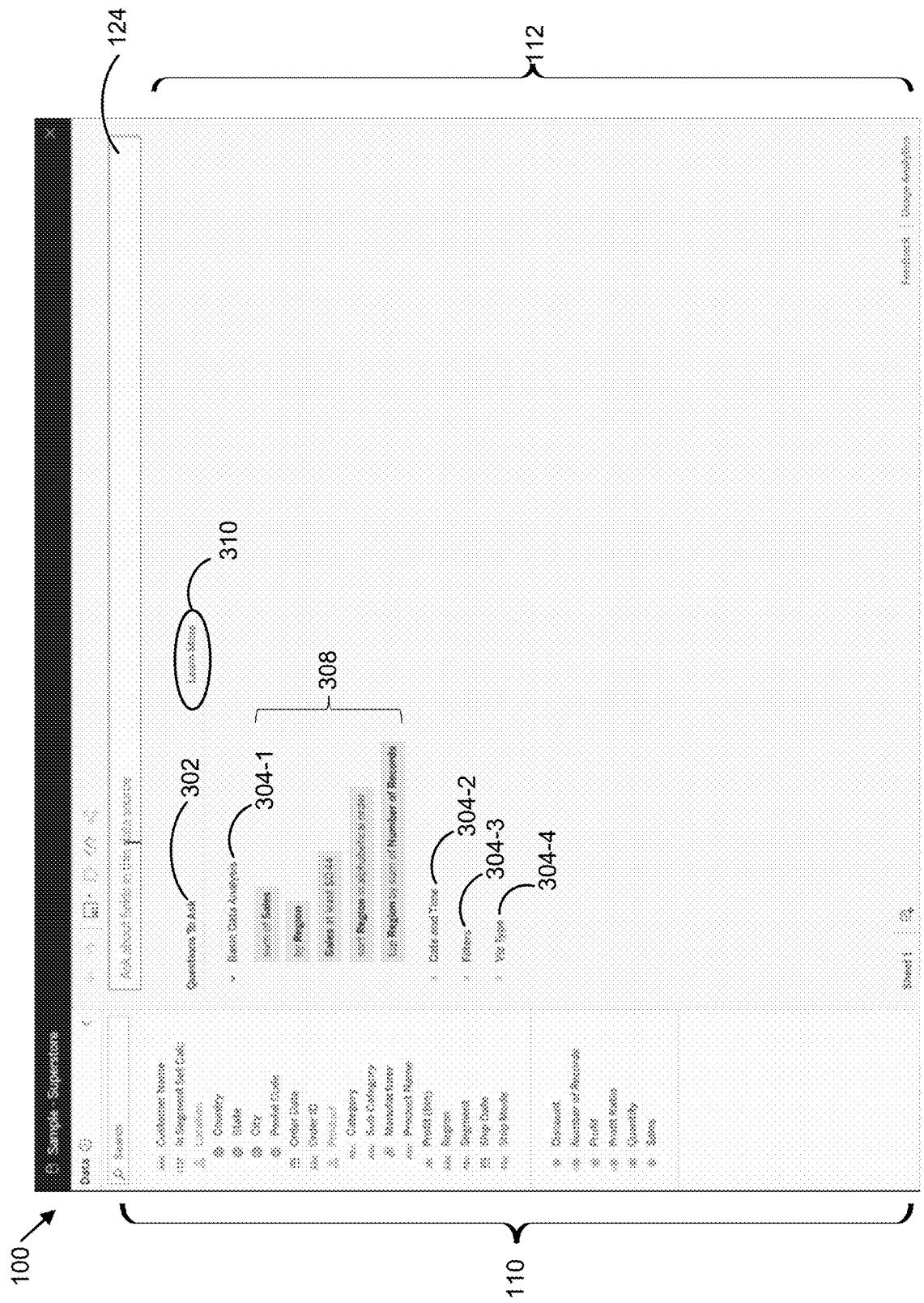
FIGS. 3A-3C provide a series of screen shots for a graphical user interface 100 according to some implementations.
Figure 3B:
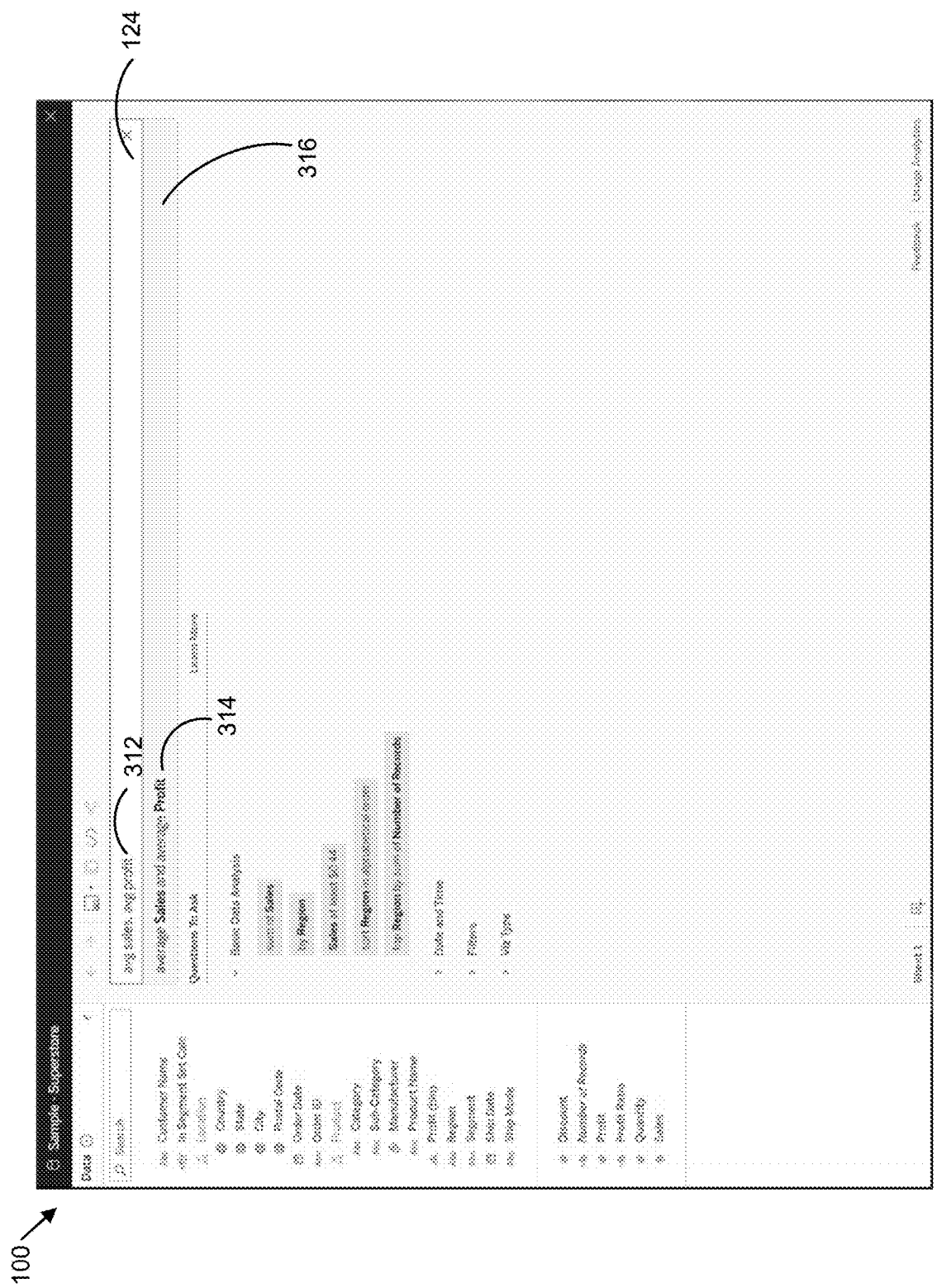
Figure 3C:
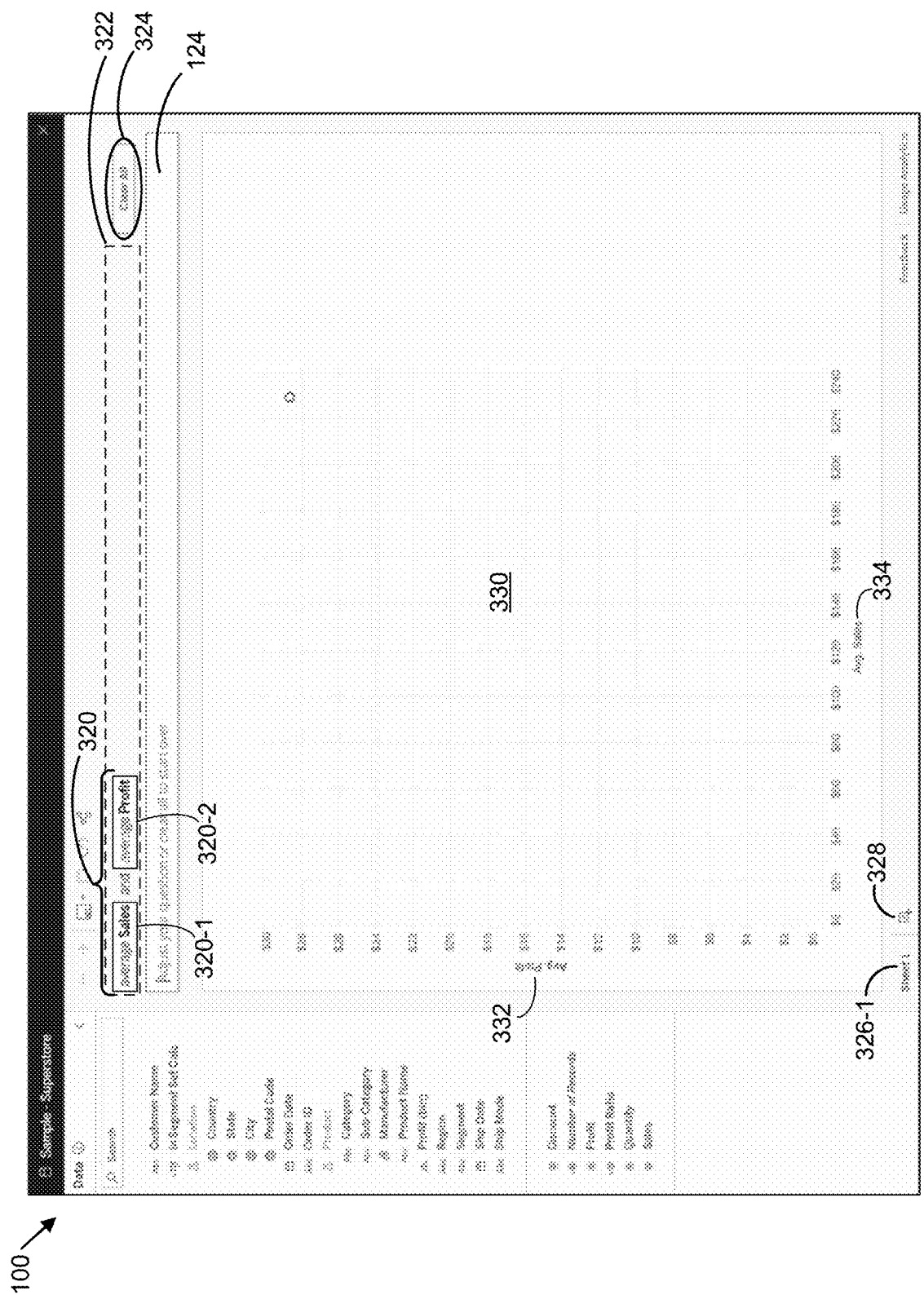

FIGS. 3A-3C provide a series of screen shots for a graphical user interface 100 according to some implementations. In this example, a user is interacting with a data source (e.g., the database/date source 258). The schema information region 110 provides named data elements (e.g., field names) of the data source 258 that may be selected and used to build a data visualization.

In some implementations, and as illustrated in FIG. 3A, the data visualization region 112 displays guidelines 302 (e.g., tips or pointers) to assist the user in interacting with the data source. The guidelines 302 may be organized by categories 304, such as a first category 304-1 "Basic Data Analysis," a second category 304-2 "Date and Time," a third category 304-3 "Filters," and a fourth category 304-4 "Viz Type" (the term "Viz" is used as an abbreviation for "Visualization"). As illustrated in FIG. 3A, the data visualization region 112 also displays, within each category, a list of possible queries 308 related to the category. The data visualization region 112 further displays a prompt 310, which may open a Help pane (not shown) or take the user to a support site that provides the user with more information about a feature (not shown).

FIG. 3B illustrates a user interaction with the graphical user interface 100. In this example, the user inputs (e.g., enters or types) a natural language expression (e.g., a natural language command) 312 "avg sales, avg profit" in the command box 124. The user may also input the natural language expression by speech, which is then captured using an audio input device 220 (e.g. a microphone) coupled to the computing device 200. Typically, the natural language expression includes one or more terms that identify data fields from a data source 258. A term may be a dimension (e.g., categorical data) or a measure (e.g., a numerical quantity). As illustrated by the example, the natural language input typically includes one or more terms (e.g., the terms "sales" and "profit" identify data fields from the data source).

In some implementations, and as described in U.S. patent application Ser. No. 16/166,125, after the user inputs the natural language command, the natural language processing module 236 parses the command into tokens. The natural language processing module 236 may use a lexicon corresponding to the data source 258 to identify analytical concepts, aggregation type, and data fields to be aggregated. The graphical user interface 100 returns (e.g., displays) one or more interpretations for the natural language command.

Referring back to FIG. 3B, in response to the natural language command 312, the graphical user interface 100 displays an interpretation 314 (also referred to as a proposed action) "average Sales and average Profit" in a dropdown menu 316 of the graphical user interface 100. In some implementations and as illustrated in FIG. 3B, the field names "Sales" and "Profit" are displayed in a visually distinctive manner (e.g., in boldface) from other words included in the interpretation 314.

FIG. 3C illustrates a data visualization 330 (e.g., a scatter plot) that is automatically generated and displayed in the graphical user interface 100 in response to user selection of the interpretation 314 "average Sales and average Profit" in FIG. 3B. In this example, the data visualization 330 is a scatter plot comprising "Avg Profit" on the y-axis 332 and "Avg Sales" on the x-axis 334. Because the averages compute a single aggregated value for each of the axes, there is a single point in this scatterplot. The graphical user interface 100 also displays, in a region 322 that is distinct from (e.g., above) the command box 124, phrases 320 that define the data visualization 330. In this example, the phrases 320 include a first phrase 320-1 "average Sales" and a second phrase 320-2 "average Profit" and define the data visualization 330. The phrases 320 include the terms "Sales" and "Profit," which correspond to field names of data fields in the dataset. The terms are visually distinguished (e.g., in boldface) from other words included in the phrases 320. In some implementations, the phrases 320 are individually enclosed in boxes, as illustrated here.

In some implementations, and as described in U.S. patent application Ser. No. 16/134,907, a user selection (e.g., via a mouse click, hover, or other input) of a term causes a widget to be generated (e.g., using the widget generation module 254). The widget prompts the user with user-selectable options (e.g., including alternative terms) to replace the selected term.

In FIG. 3C, the graphical user interface 100 also displays a "Clear All" icon (e.g. button) 324. In some implementations, the user can remove an existing data visualization data from the visualization region 112 by selecting the icon 324. User selection of the icon 324 also removes from display the phrases 320 that define the data visualization.

As further depicted in FIG. 3C, the data visualization 330 is displayed on a worksheet 326-1 (also referred to as a "sheet" or a "viz"). User selection of the "add worksheet" icon 328 causes additional sheet(s) to be added. The data visualization application 230 can generate multiple data visualizations and display the data visualizations on the different worksheets. The user can view, and interact with, multiple data visualizations simultaneously by by toggling between the worksheets FIGS. 4A and 4B provide a series of screen shots for updating a data visualization using a conversational operation according to some implementations.

Figure 4A:
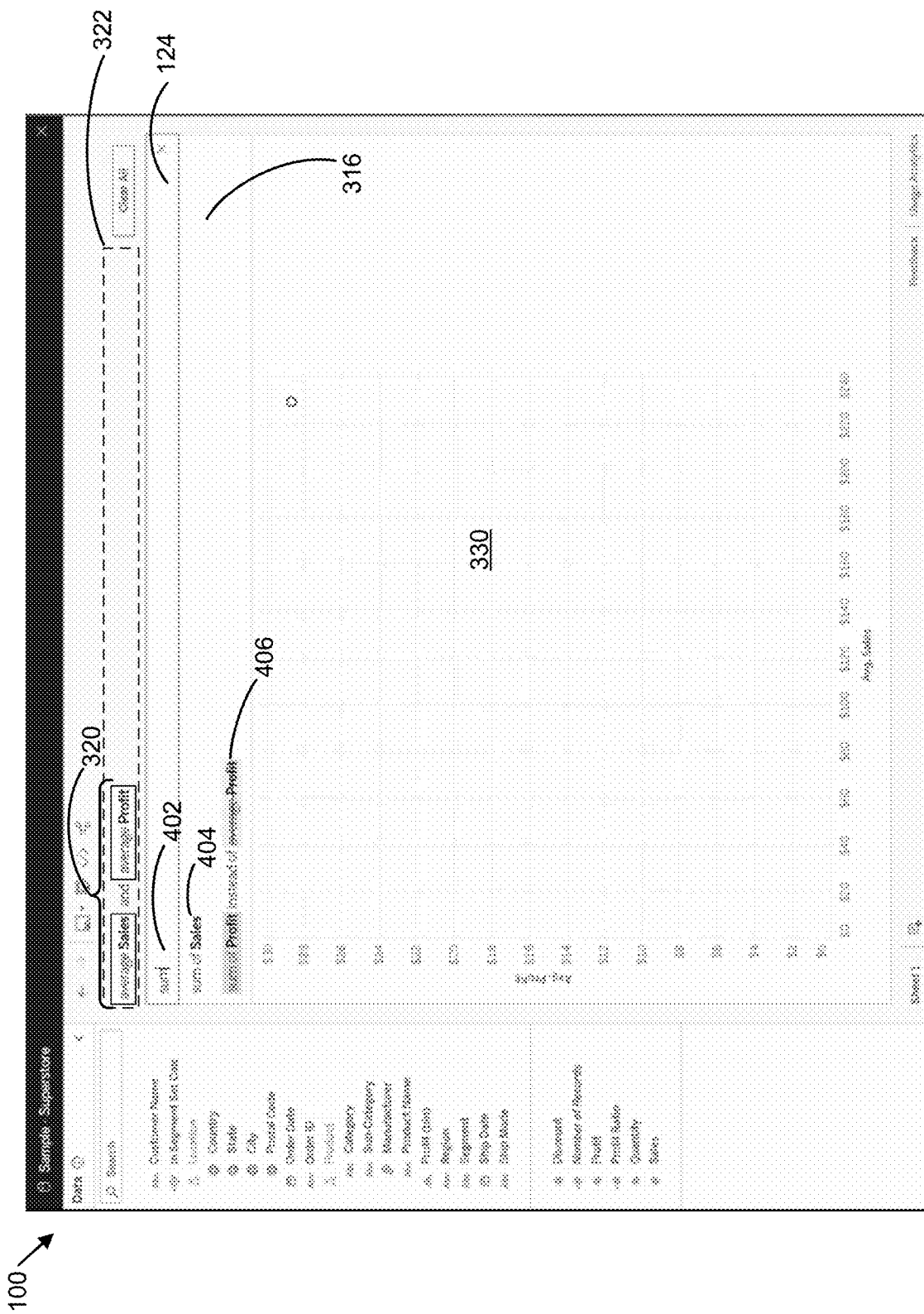
FIGS. 4A and 4B provide a series of screen shots for updating a data visualization using a conversational operation according to some implementations.

FIG. 4A illustrates a user interaction with the data visualization 330 shown in FIG. 3C. In this example, the user inputs (e.g., enters or types) a natural language expression (e.g., a natural language command) 402 "sum" in the command box 124. The graphical user interface 100 displays a first interpretation 404 "sum of Sales" and a second interpretation 406 that specifies replacing "average Profit" with "sum of Profit" (using strikeout for the phrase to be replaced). The interpretations are displayed in the dropdown menu 316 in response to the command 402. The first interpretation 404 corresponds to a proposed action to add the phrase "sum of Sales" to the existing phrases 320 that define the data visualization 330. The second interpretation 406 corresponds to a proposed action to replace the existing phrase 320-2 "average Profit" with a different phrase "sum of Profit." In a proposed action to replace a phrase, such as the second interpretation 406, the phrase that will be replaced (e.g., the phrase 320-2 "average Profit") is presented in strikethrough format.

In some implementations, the interpretations are displayed in a ranked order, based on at least one of: the closeness of match between the extracted analytical phrases and a canonical representation of an analytical expression; the frequency of usage of a field name based on previous user history; and/or the saliency or weight of a missing term that is inferred from the natural language command. As discussed in U.S. patent application Ser. No. 16/234,470, in some implementations the natural language processing module 236 assigns canonical representations/forms to analytical expressions to address the problem of proliferation of ambiguous syntactic parses inherent to natural language querying. A closer match between the extracted analytical phrases and the canonical representation of an analytical expression may indicate a lower degree of ambiguity and gives rise to a higher ranking for the proposed action. In some implementations, data attributes and values of data fields also affect ranking.

Figure 4B:
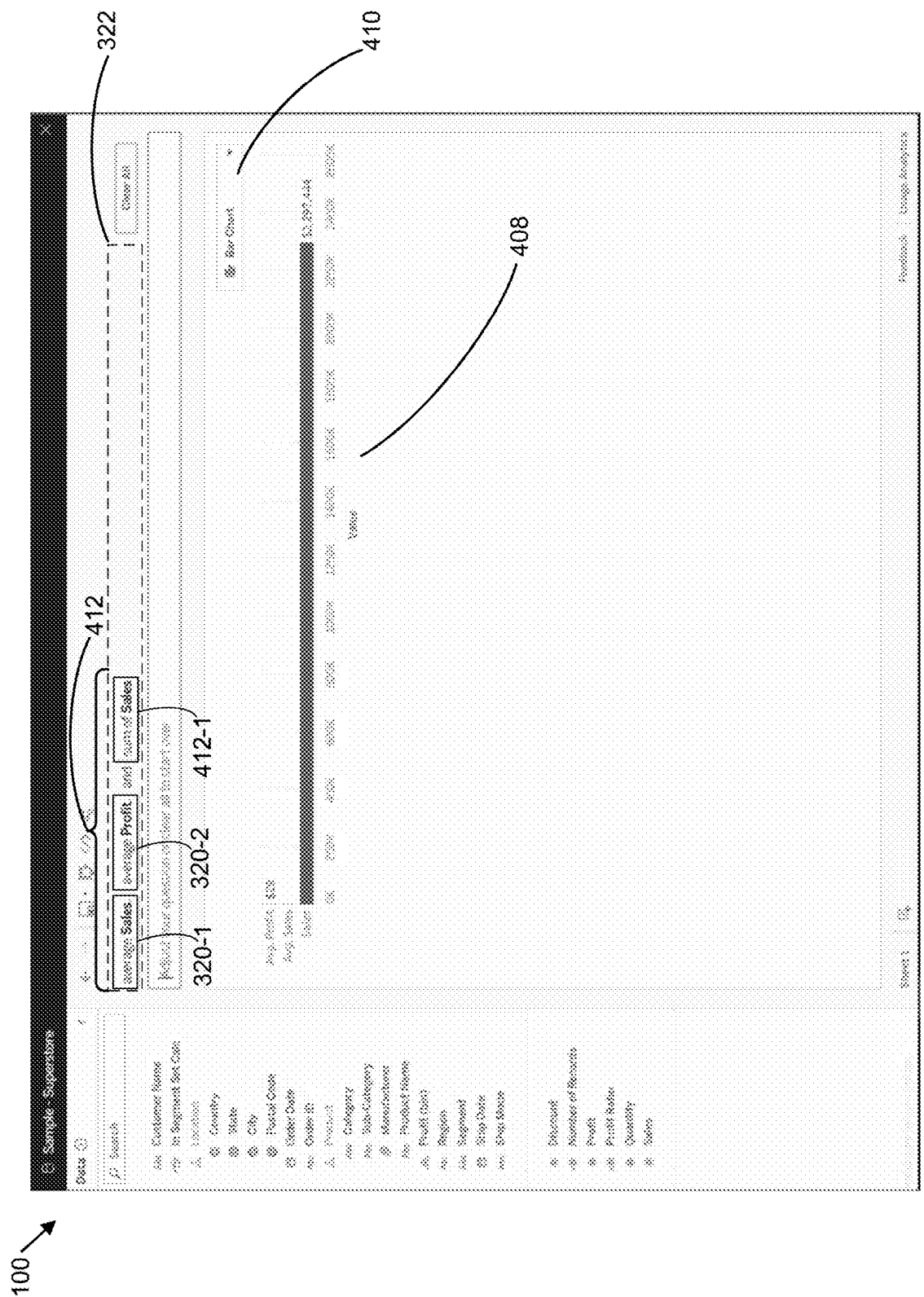

FIG. 4B illustrates an updated data visualization 408 (a bar chart) that is automatically generated and displayed in the graphical user interface 100 in response to user selection of the first interpretation 404 "sum of Sales." In some implementations, the type of data visualization may be changed by using a view type selector 410. The graphical interface 100 also displays, in the region 322, updated phrases 412 that define the updated data visualization 408. In this example, the updated phrases 412 include the first phrase 320-1 "average Sales," the second phrase 320-2 "average Profit," and a third phrase 412-1 "sum of Sales," corresponding to the first interpretation 404.

Figure 5A:
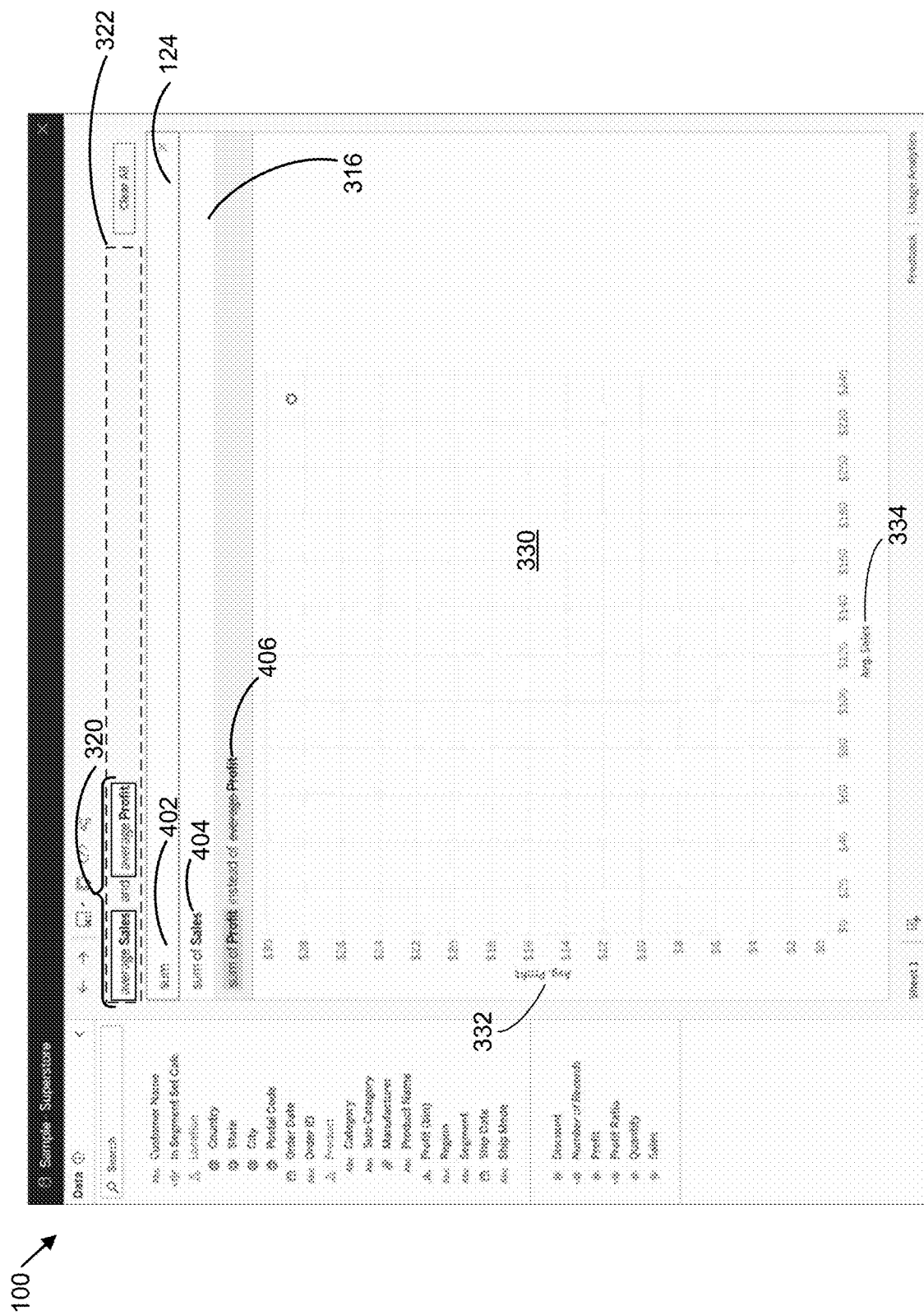
FIGS. 5A and 5B provide a series of screen shots for updating a data visualization using a "replace" conversational operation according to some implementations.
Figure 5B:
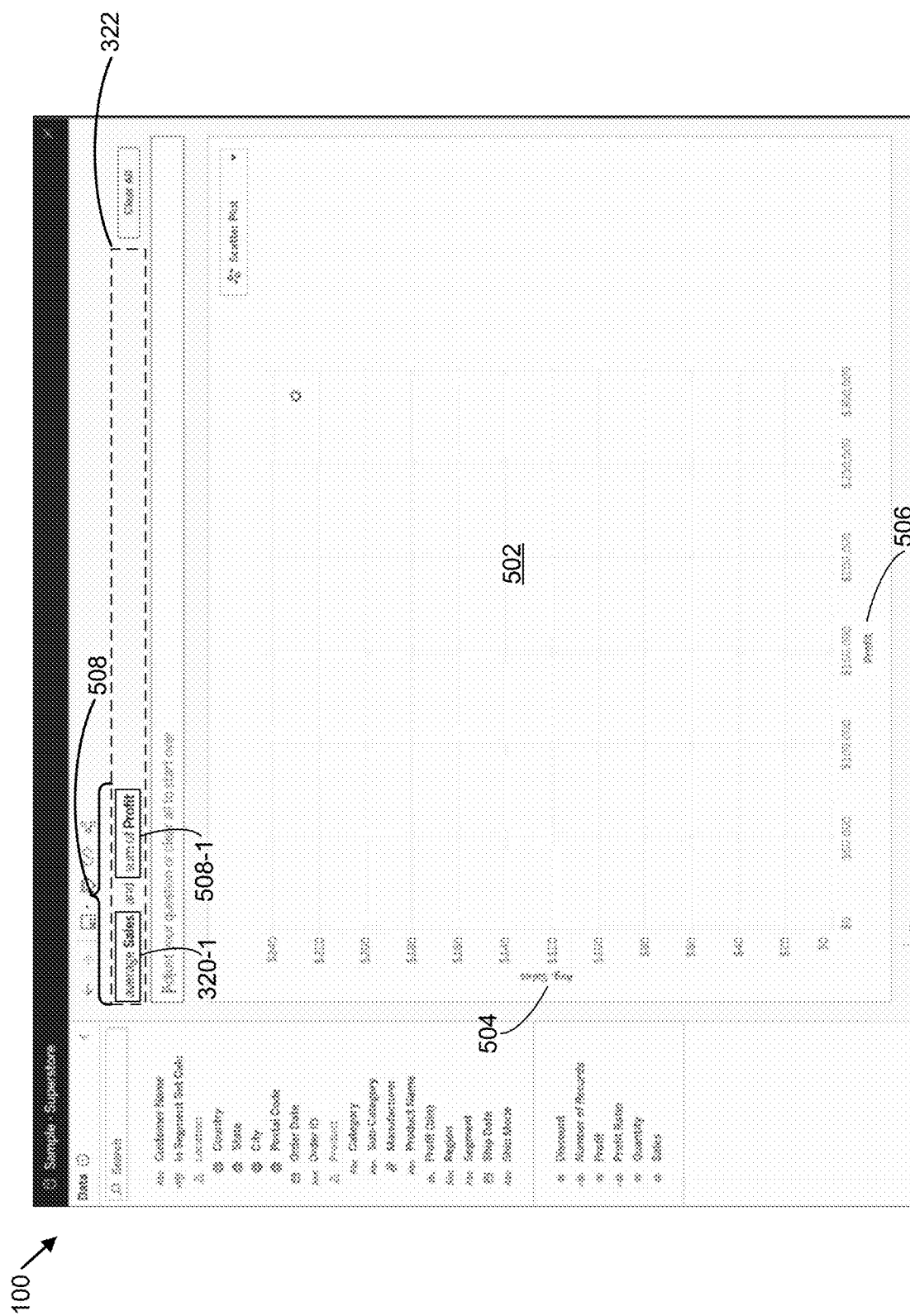

FIGS. 5A and 5B provide a series of screen shots for updating a data visualization using a "replace" conversational operation according to some implementations.

FIG. 5A shows the data visualization 330 of FIG. 4A. In this example, the user selects the second interpretation 406 (replacing "average Profit" with "sum of Profit") in the dropdown menu 316 in response to the natural language command 402.

FIG. 5B illustrates an updated data visualization 502 (e.g., a scatter plot) that is automatically generated and displayed in the graphical user interface 100 in response to user selection of the second interpretation 406. In this example, the updated data visualization 502 is a scatter plot with the term "Avg Sales" on the y-axis 504 and the term "Profit" (e.g., sum of profit) on the x-axis 506. (Again there is only one graphed point because of the aggregation on both axes.) The updated phrases 508 that define the updated data visualization 502 are displayed in the region 322. The updated phrases 508 include the first phrase 320-1 "average Sales." The second phrase 320-2 "average Profit" that was part of the phrases 320 in FIG. 5A has been replaced with a different phrase 508-1 "sum of Profit".

FIGS. 6A-6D provide a series of screen shots for updating a data visualization using a "remove" conversational operation according to some implementations.

Figure 6A:
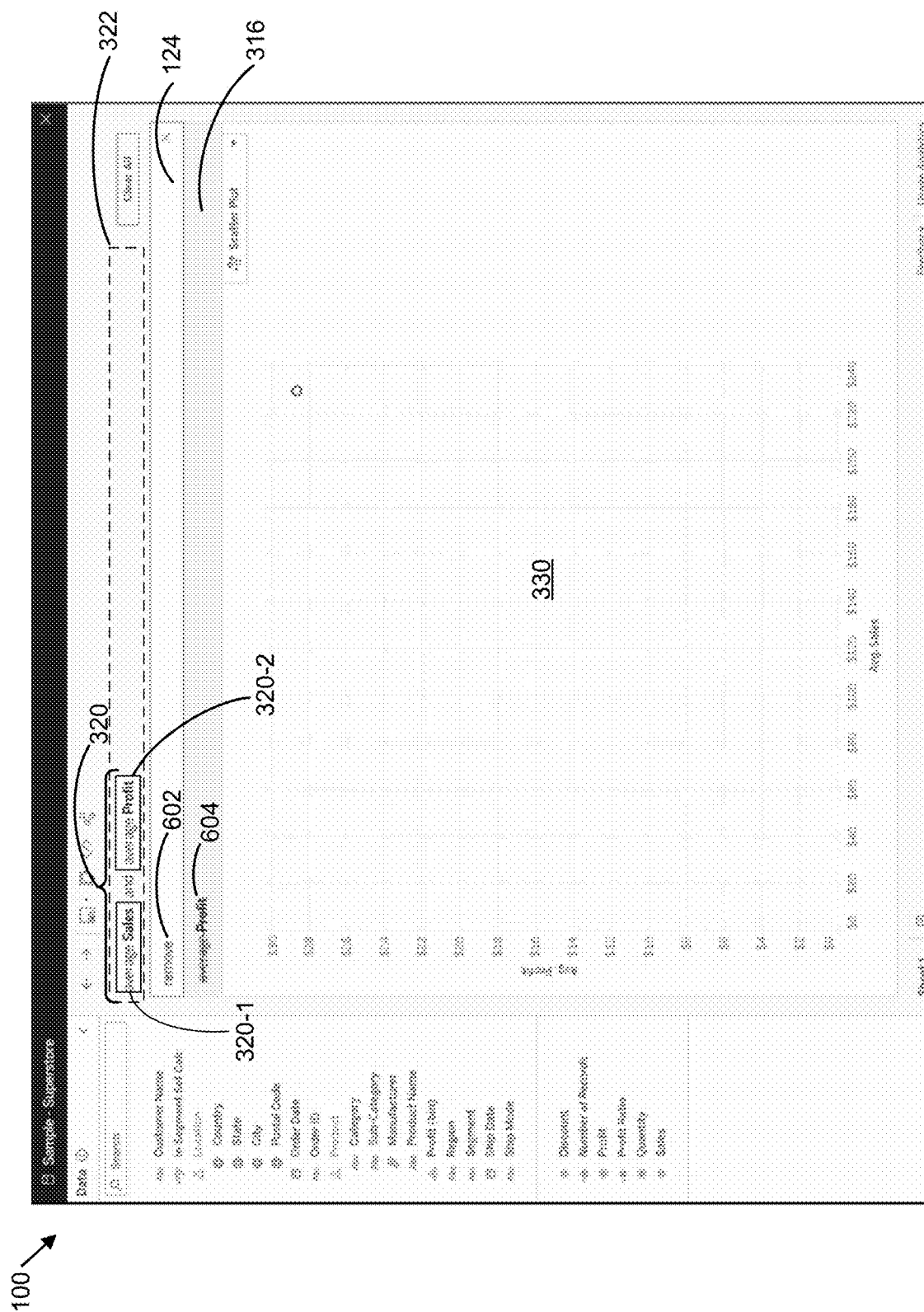
FIGS. 6A-6D provide a series of screen shots for updating a data visualization using a "remove" conversational operation according to some implementations.

FIG. 6A illustrates a user interaction with the data visualization 330 in FIG. 3C. In this example, the user inputs a natural language command 602 "remove" in the command box 124. The graphical user interface 100 displays an interpretation 604 that removes the "average Profit" phrase (e.g., using a strikeout font) in the dropdown menu 316 in response to the natural language command 602. The interpretation 604 corresponds to a proposed action to remove the phrase 320-2 "average Profit" from the existing phrases 320. In some implementations, and as illustrated in FIG. 6A, the interpretation 604 is displayed in a strikethrough format, so as to elucidate to the user that selection of the interpretation 604 will cause the corresponding phrase 320-2 to be removed.

Figure 6B:
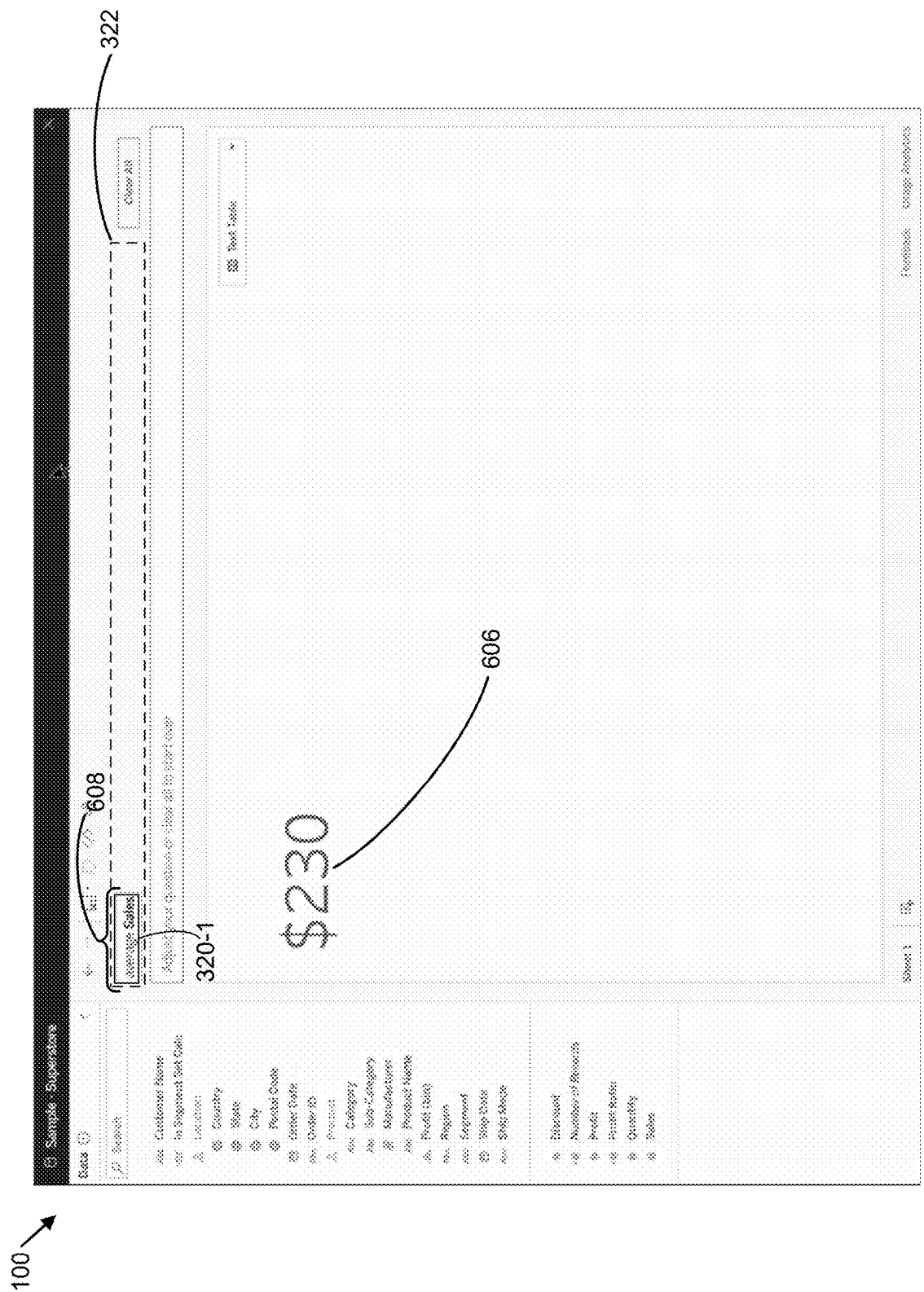

FIG. 6B illustrates an updated data visualization 606 (e.g., a text table) that is automatically generated and displayed in the graphical user interface 100 in response to user selection of the interpretation 604. The graphical interface 100 displays, in the region 322, an updated phrase list 608 that defines the updated data visualization 606. In this example, the updated phrase list 608 is just the phrase 320-1 "Average Sales" that remains after the phrase 320-2 "average Profit" has been removed. Because there is only one variable (average Sales 320-1), the data visualization application has switched from a scatterplot to a text table with the single value "$230".

In some implementations, the "remove" operation includes removing all phrases of a certain type. This is illustrated in FIGS. 6C and 6D.

Figure 6C:
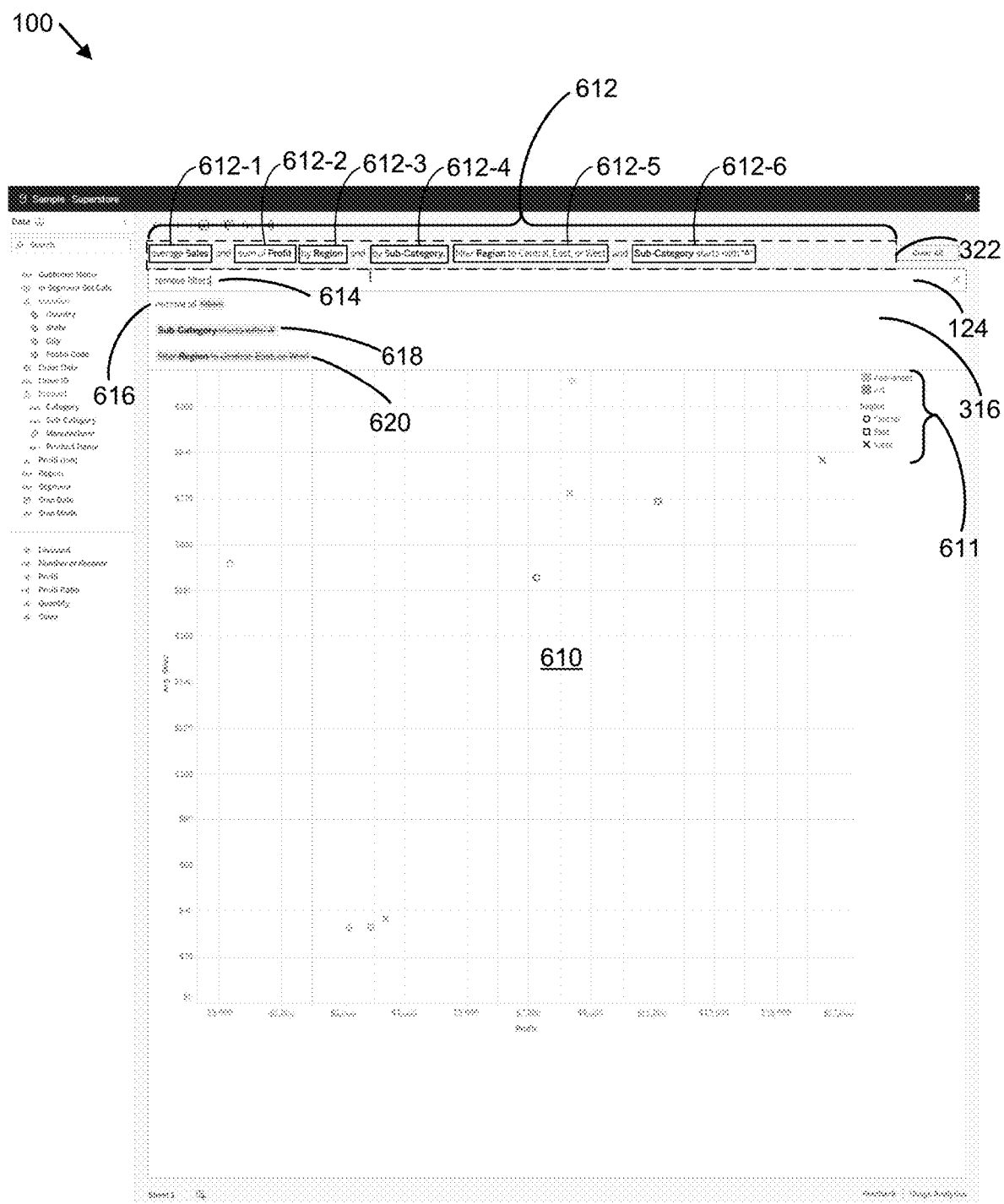

FIG. 6C shows a data visualization 610, which comprises a scatter plot of average sales (y-axis) and sum of profits (x-axis). As depicted in the legend 611, the data points on the scatter plot 610 correspond to average sales and sum of profits for the sub-categories "appliances" and "art" and by the regions "Central," "East," and "West." The data visualization 610 is defined by the phrases 612, including a first phrase 612-1 "average Sales," a second phrase 612-2 "sum of Profit," a third phrase 612-3 "by Region," a fourth phrase 612-4 "by Sub-Category," a fifth phrase 612-5 "filter Region to Central, East, or West," and a sixth phrase 612-6 "Sub-Category starts with 'A'".

In some instances, and as illustrated in FIG. 6C, a user inputs a natural language command 614 "remove filters" in the command box 124. In response to the natural language command 614, the graphical user interface 100 displays a first interpretation 616 to remove all filters (e.g., with the term "filters" in a strikeout font), which corresponds to a proposed action to remove all phrases of the type "filter." In this example, two of the phrases (the fifth phrase 612-5 "filter Region to Central, East, or West" and the sixth phrase 612-6 "Sub-Category starts with 'A'") belong to the type "filter." The graphical user interface 100 also displays a second interpretation 618 to remove just the filter "Sub Category starts with 'A'" 612-6. The graphical user interface 100 further displays a third interpretation 620 to remove just the filter "filter Region to Central, East, or West" 612-5.

Figure 6D:
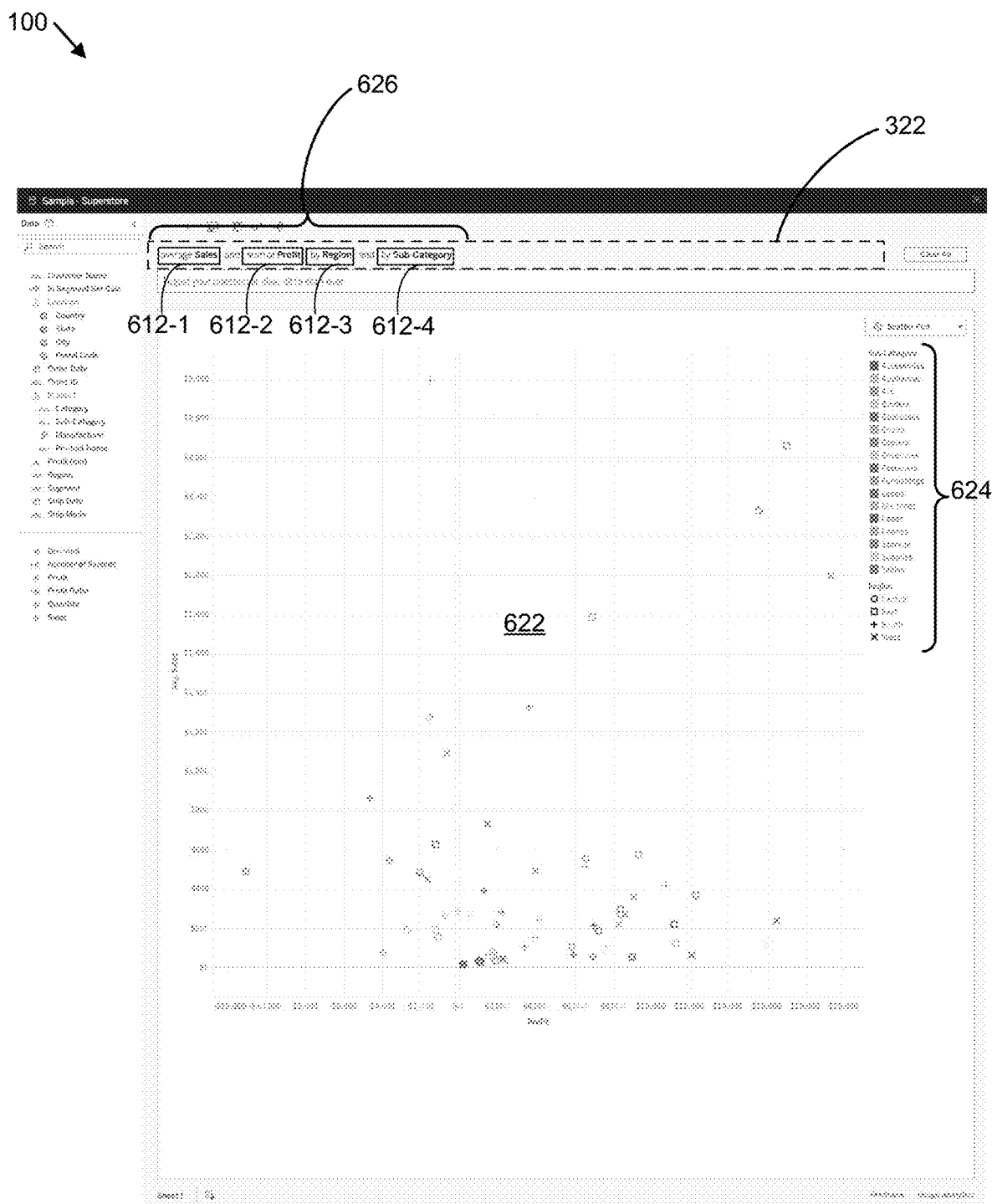

FIG. 6D illustrates an updated data visualization 622 (e.g., a scatter plot) that is automatically generated and displayed in the graphical user interface 100 in response to user selection of the interpretation 616. In this example, because all phrases belonging to the type "filter" (the fifth and sixth phrases 612-5 and 612-6) have been removed, the updated data visualization 622 displays data points corresponding to the average sales and sum of profit for all data values in the sub-categories (e.g., field names "Accessories", "Appliances", "Art". "Binders", "Bookcases", "Chairs", "Copiers", "Envelopes", "Fasteners", "Furnishings", "Labels", "Machines", "Paper", "Phones", Storage", "Supplies", and "Tables') and for all regions (e.g., "Central", "East", "South", and "West"), as depicted in the legend 624. In other words, the data points are no longer limited to those whose field names begin with the letter "A" or limited to the Central, East, and West regions.

FIGS. 7A-7G provide a series of screen shots for updating a data visualization using conversational features that add, remove, or replace phrases in an existing data visualization according to some implementations.

Figure 7A:
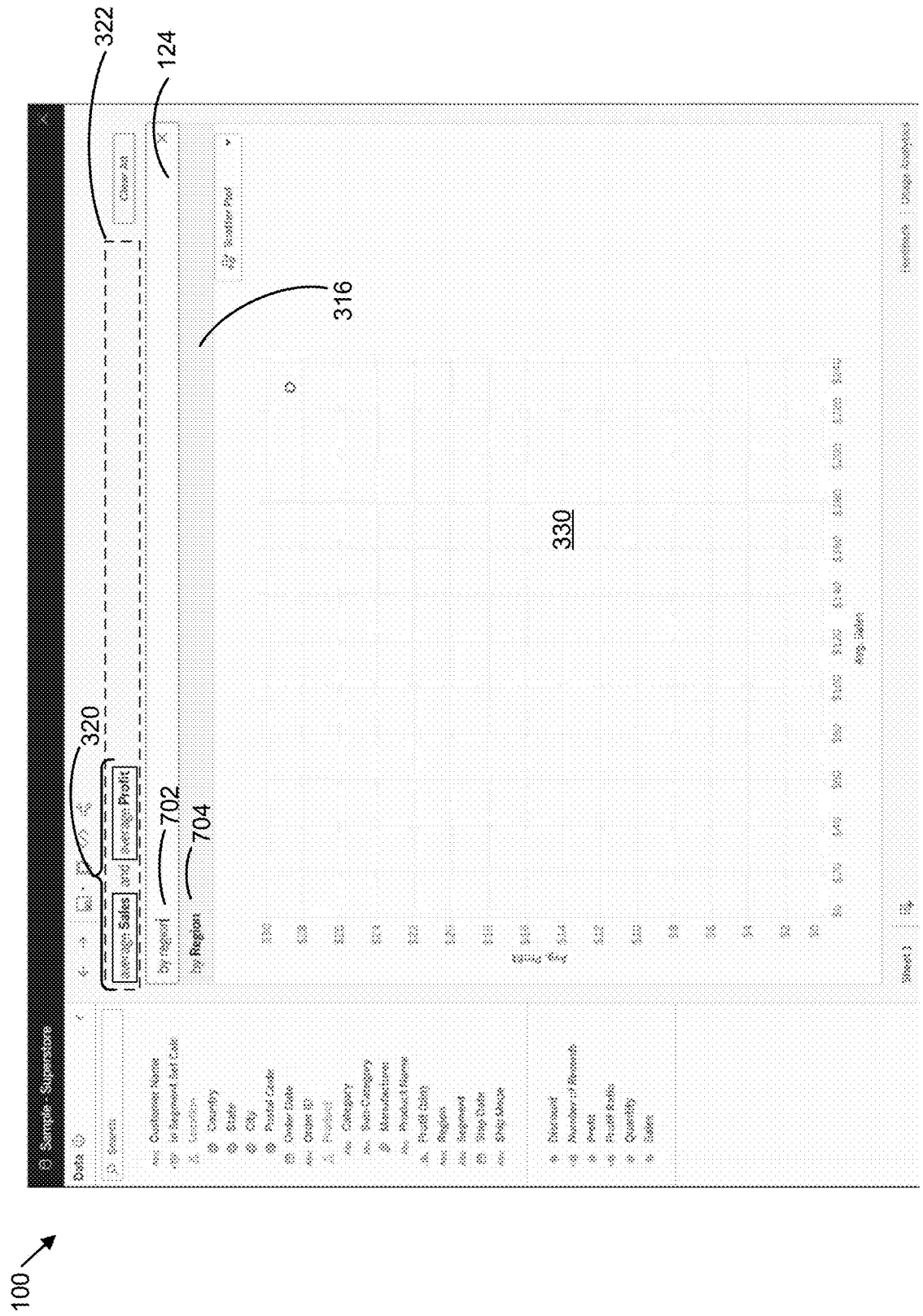
FIGS. 7A-7G provide a series of screen shots for updating a data visualization using conversational features that add, remove, or replace phrases in an existing data visualization according to some implementations.

FIG. 7A shows the data visualization 330 of FIGS. 3C, 4A, 5A, and 6A. The data visualization 330 is a scatter plot that includes a single data point corresponding to the average profit and average sales for all products in the dataset. The user inputs a natural language command 702 "by Region" in the command box 124. In response to the natural language command 702, the graphical user interface 100 displays an interpretation 704 "by Region" in the dropdown menu 316. The interpretation 704 corresponds to a proposed action to group the products by region.

Figure 7B:
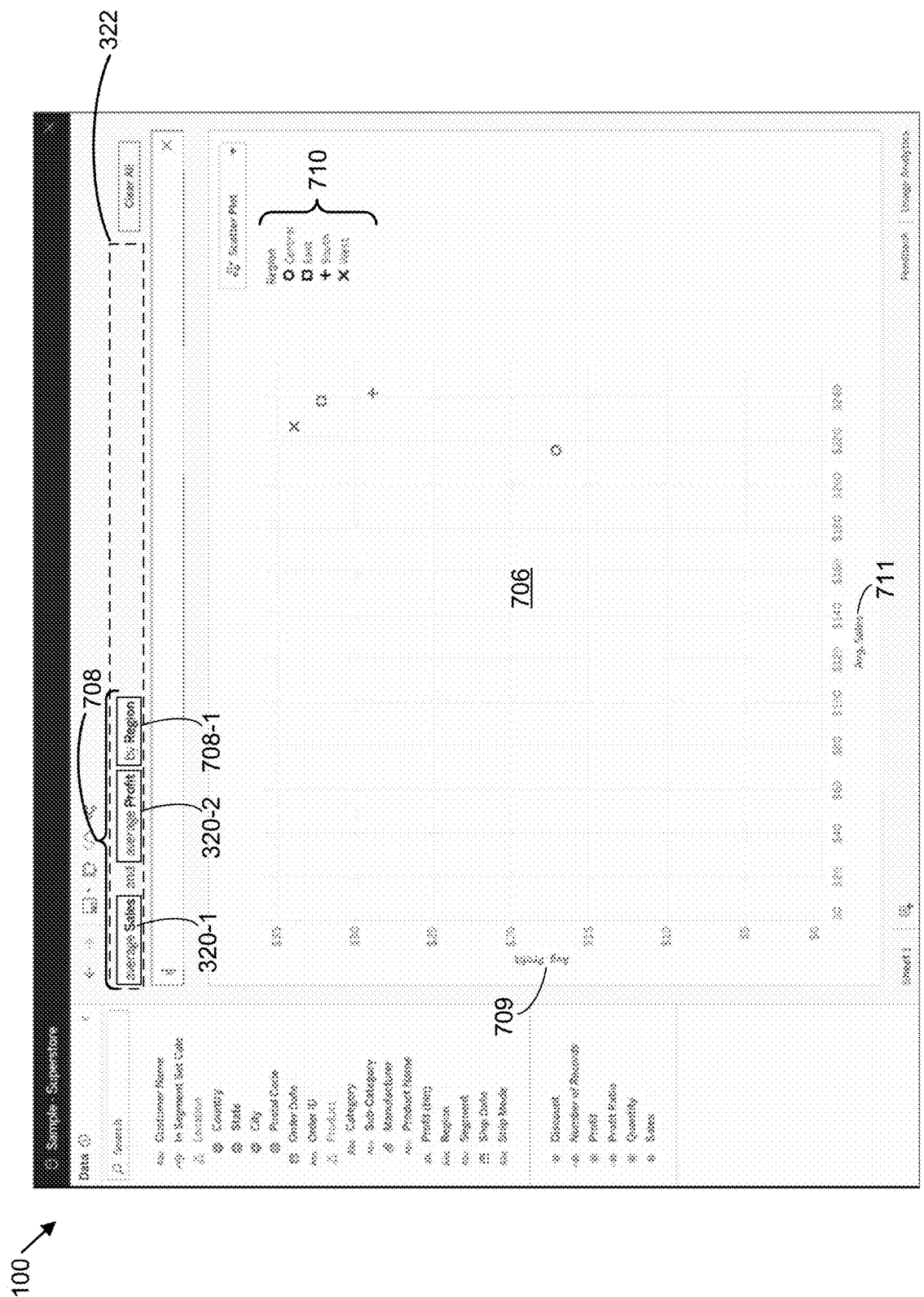

FIG. 7B shows an updated data visualization 706 that is automatically generated and displayed in the graphical user interface 100 in response to user selection of the interpretation 704. The phrases 708 that define the data visualization 706 include the phrase 320-1 "average Sales", the phrase 320-2 "average Profit", and the phrase 708-1 "by Region." The updated data visualization 706 is a scatter plot that includes four data points corresponding to the average profit (y-axis 709) and average sales (x-axis 711) of all products grouped by the regions "Central," "East," "South," and "West."

Figure 7C:
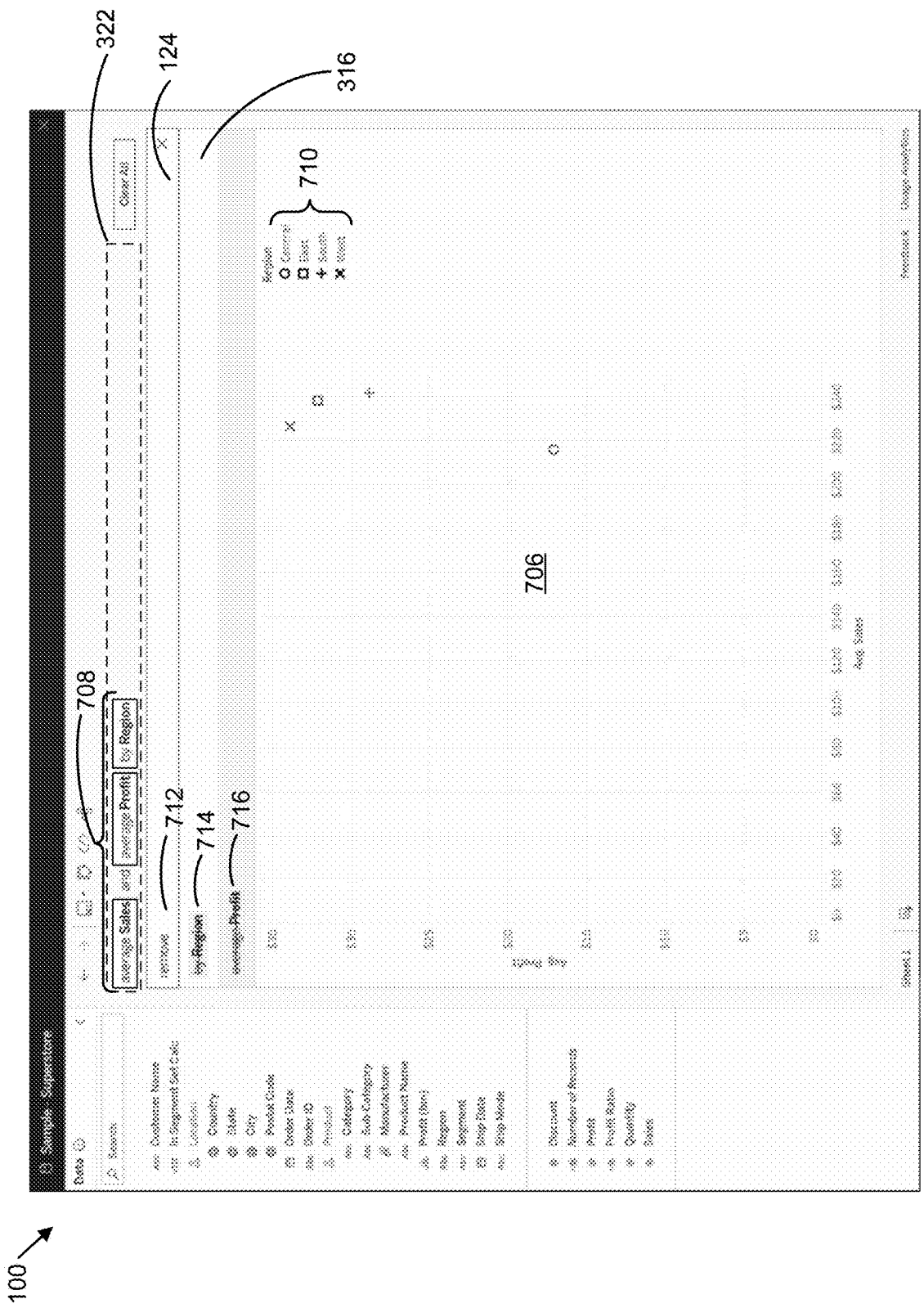

In FIG. 7C, the user inputs a natural language command 712 "remove" in the command box 124. In response to the natural language command 712, the graphical user interface 100 displays a first interpretation 714 to remove the phrase 708-1 "by Region." The graphical user interface 100 also displays a second interpretation 716 to remove the phrase 302-2 "average Profit".

Figure 7D:
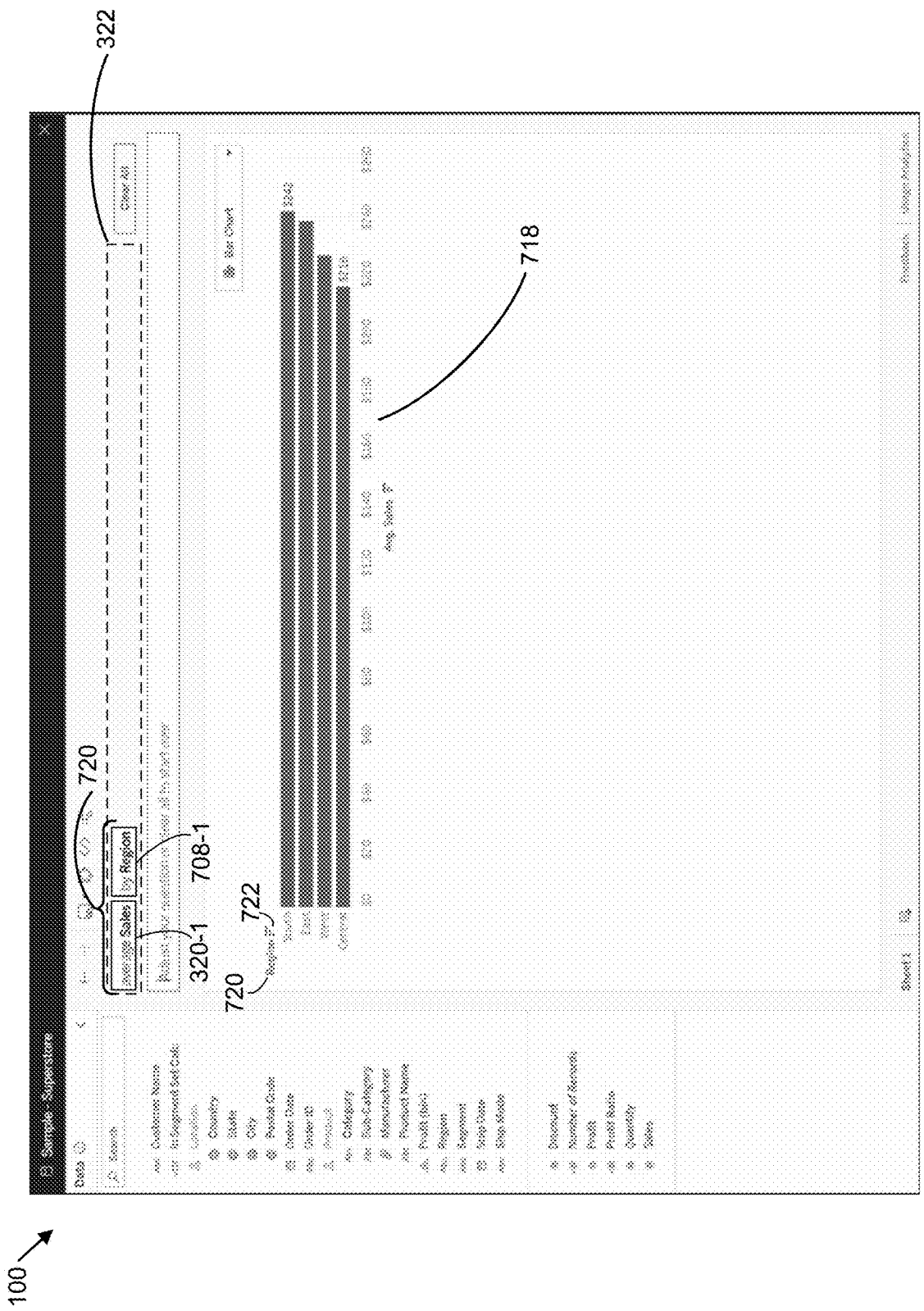

FIG. 7D illustrates an updated data visualization 718 that is automatically generated and displayed in the graphical user interface 100 in response to user selection of the interpretation 716 (remove average profit). In this example, the updated data visualization 718 is a bar chart representing the average sales by region. The "Region" column header 720 indicates that each row of the bar chart corresponds to a region. In some implementations, the data visualization 718 includes a default order in which the rows of the bar chart are presented. For example, the sort indicator 722 indicates that the rows are currently sorted descending order of average sales.

Figure 7E:
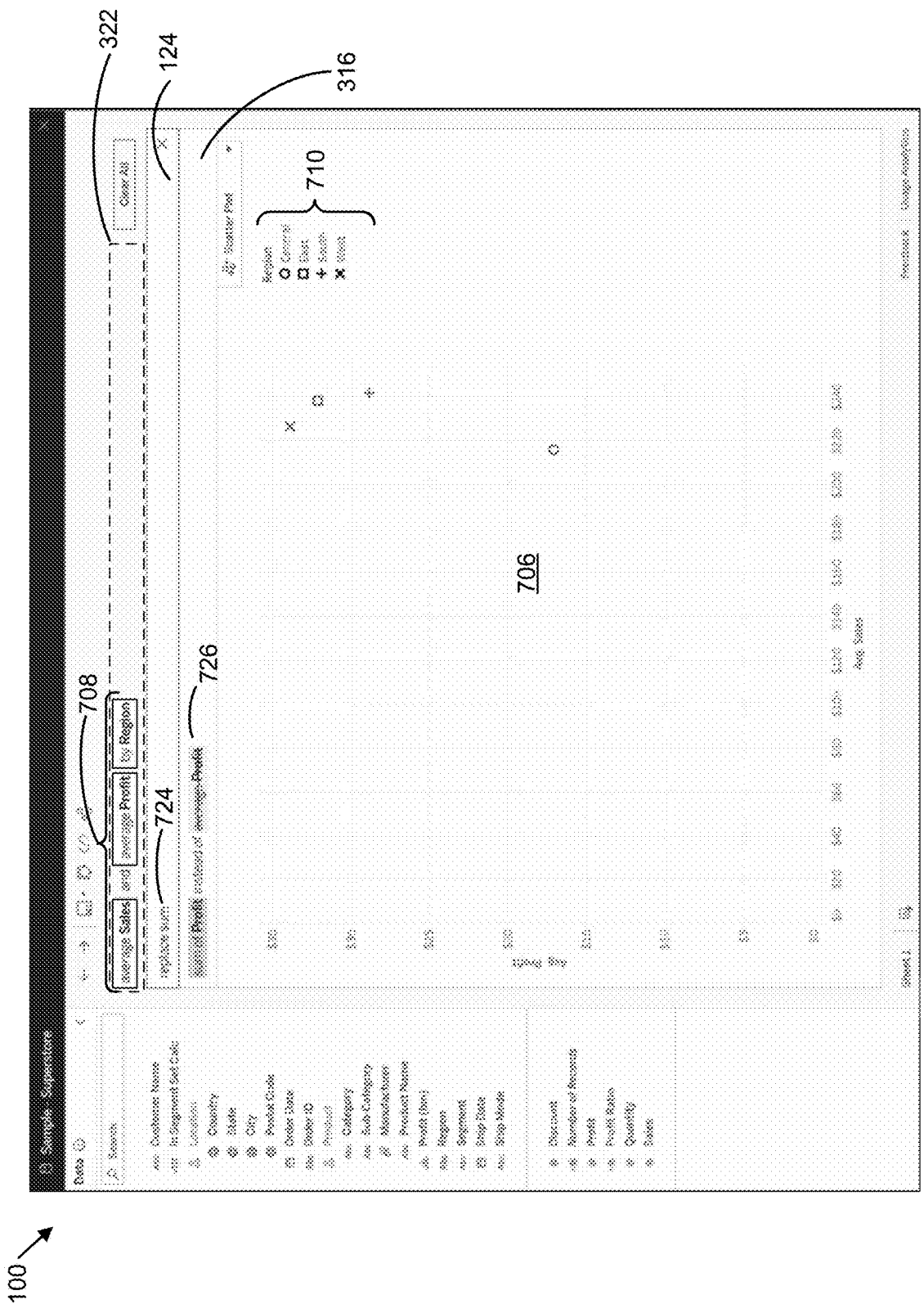

FIG. 7E shows the data visualization 706 of FIG. 7B. The user inputs a natural language command 724 "replace sum" in the command box 124. In response to the natural language command 724, the graphical user interface 100 displays an interpretation 726 to replace the phrase 320-2 "average Profit" with a different phrase "sum of Profit".

Figure 7F:
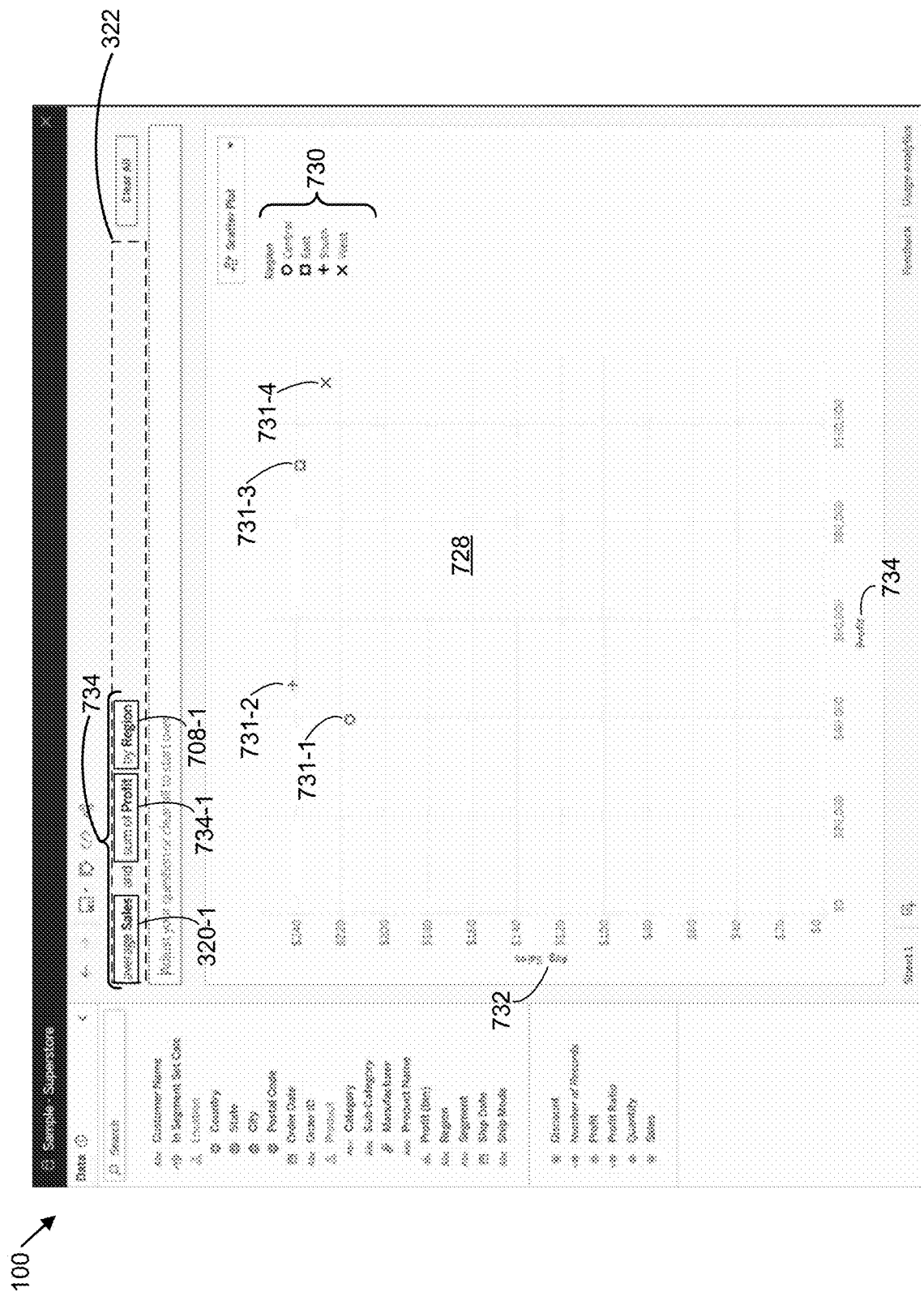

FIG. 7F illustrates an updated data visualization 728 (e.g., a scatter plot) that is automatically generated and displayed in the graphical user interface 100 in response to user selection of the interpretation 726. The phrases 734 that define the updated data visualization 728 include the phrase 320-1 "average Sales", the phrase 734-1 "sum of Profit", and the phrase 708-1 "by Region." The four data points 731 (731-1, 731-2, 731-3, and 731-4) on the scatter plot 728 represent average sales and profit (e.g., sum of Profit) for the regions "Central", "East", "South", and "West".

Figure 7G:
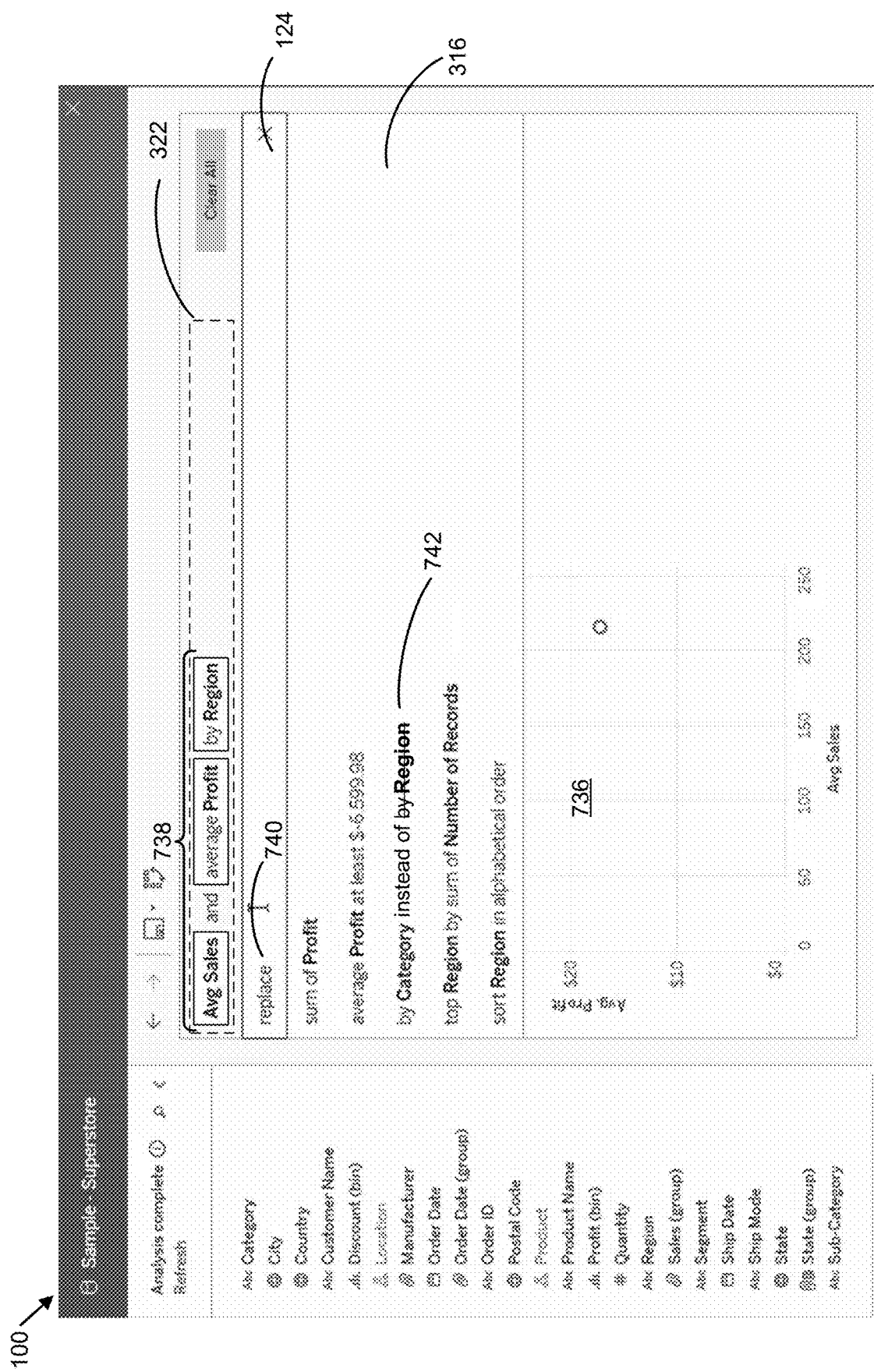
Figure 8A:
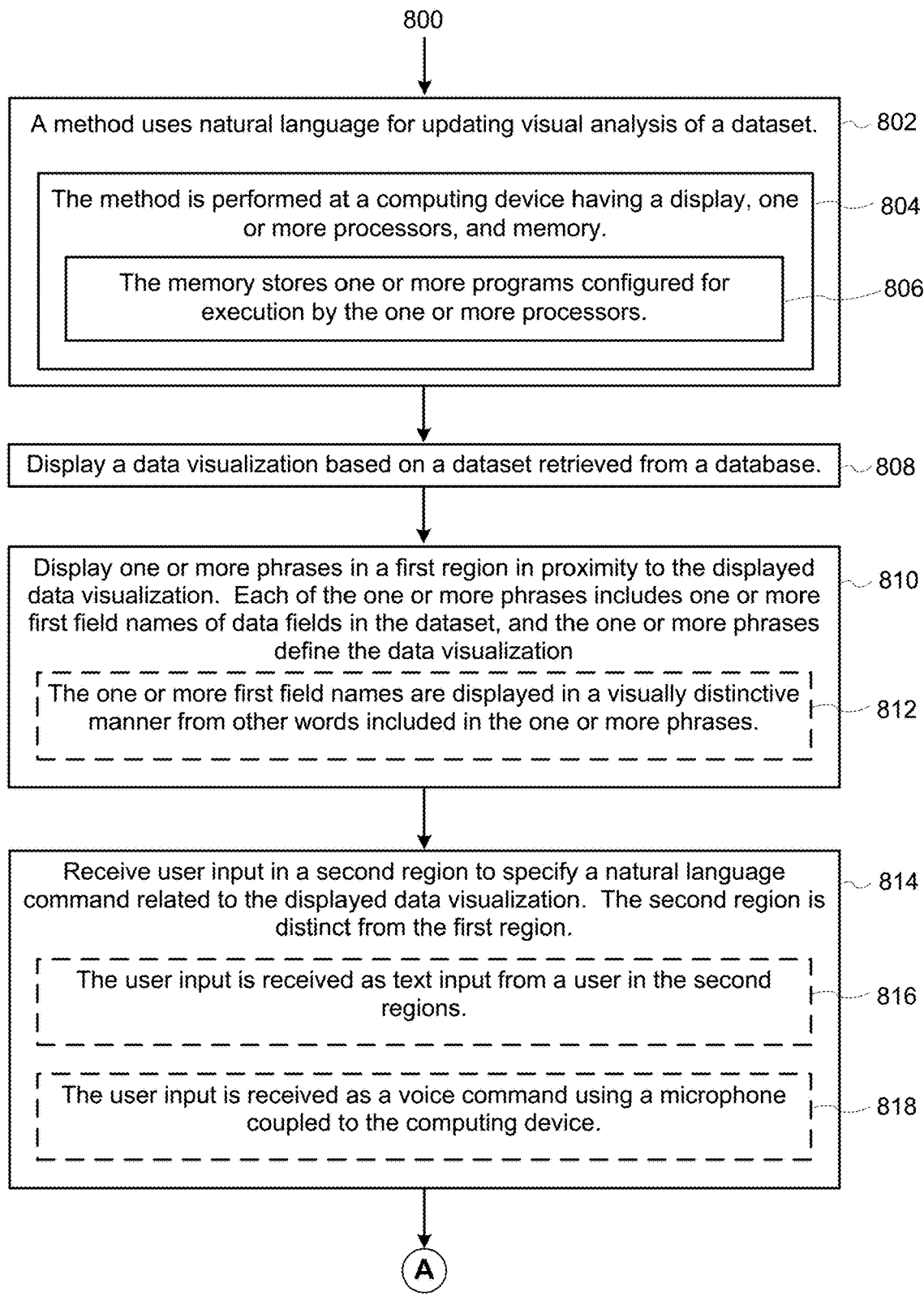
Figure 8B:
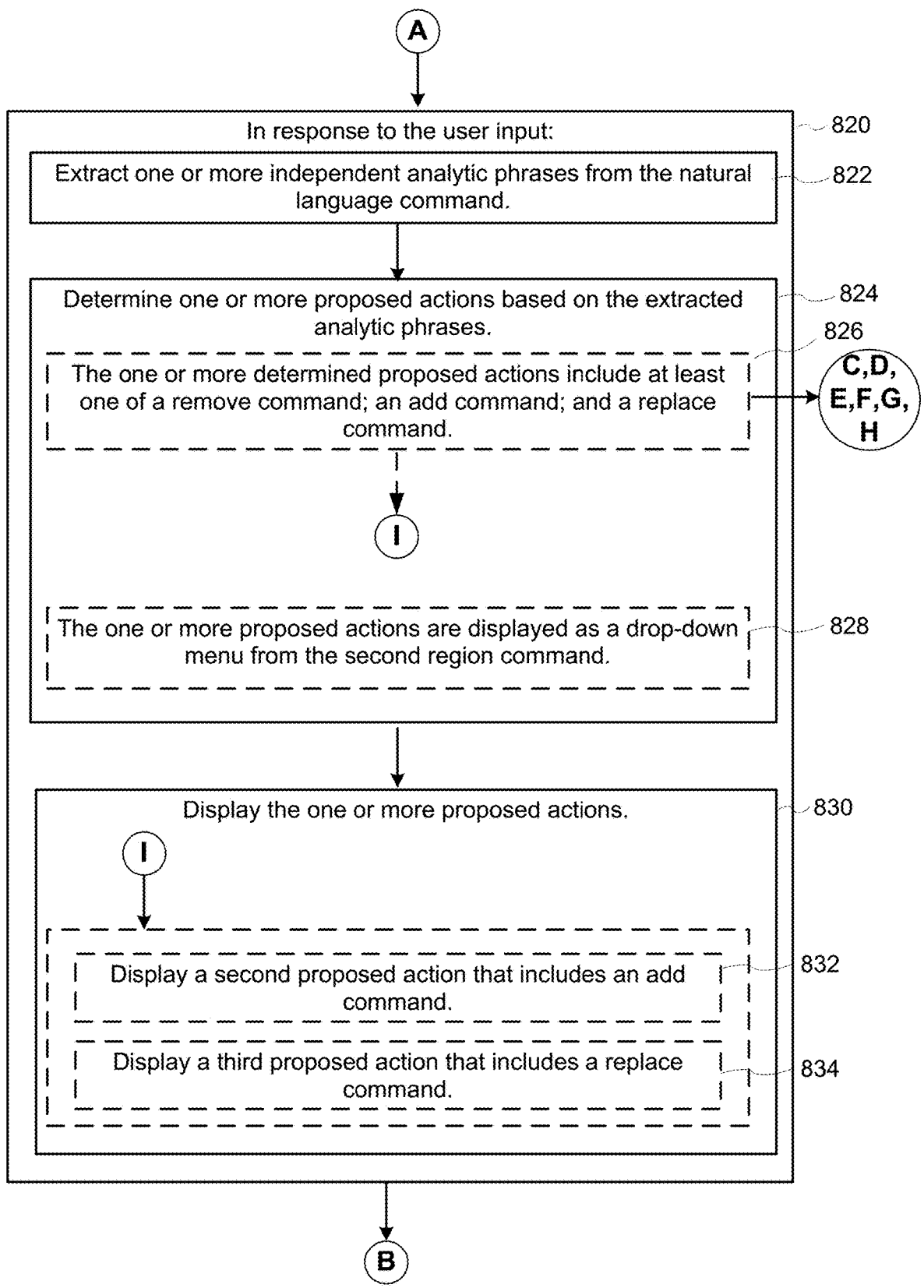
Figure 8C:
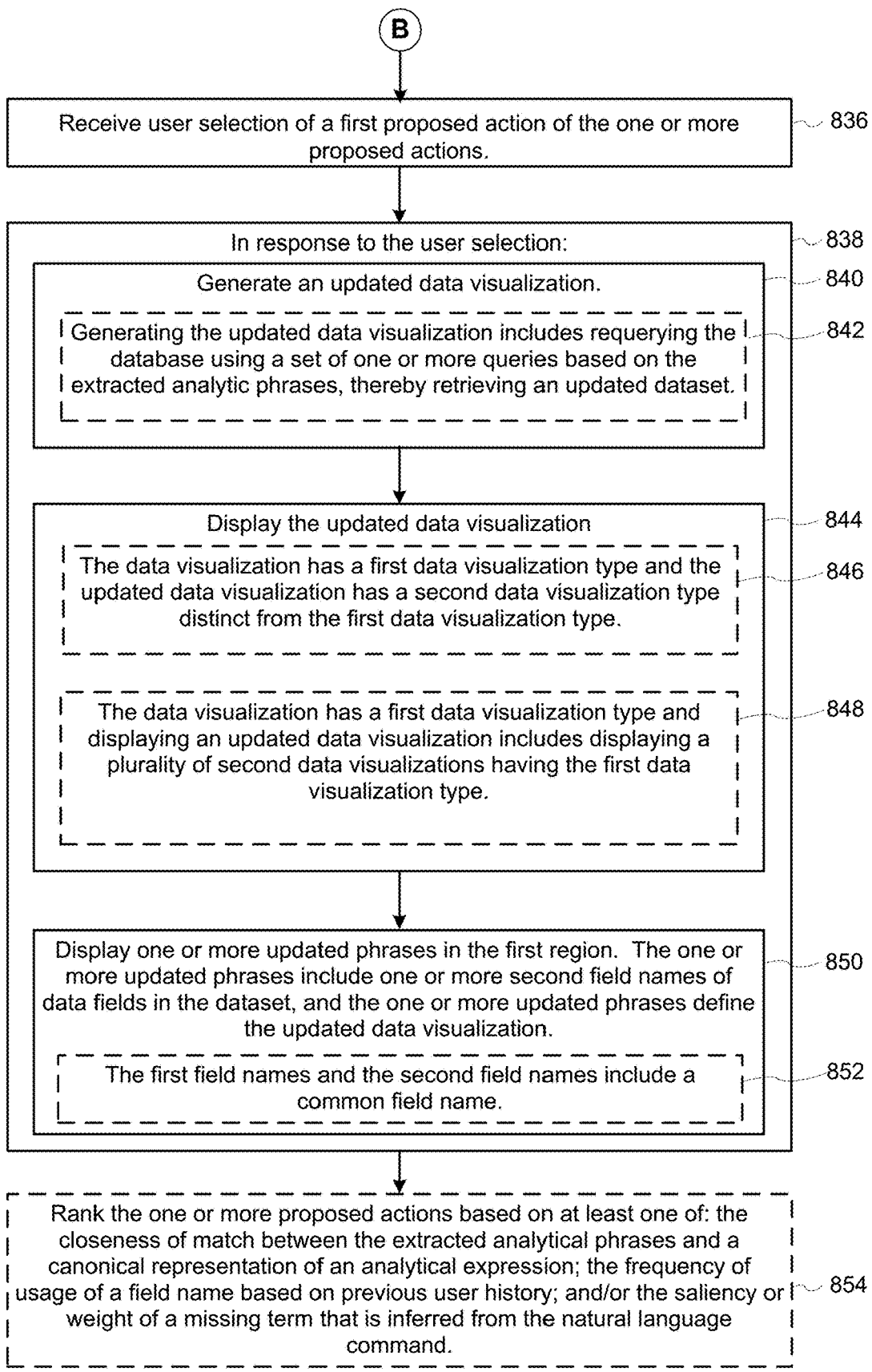
Figure 8D:
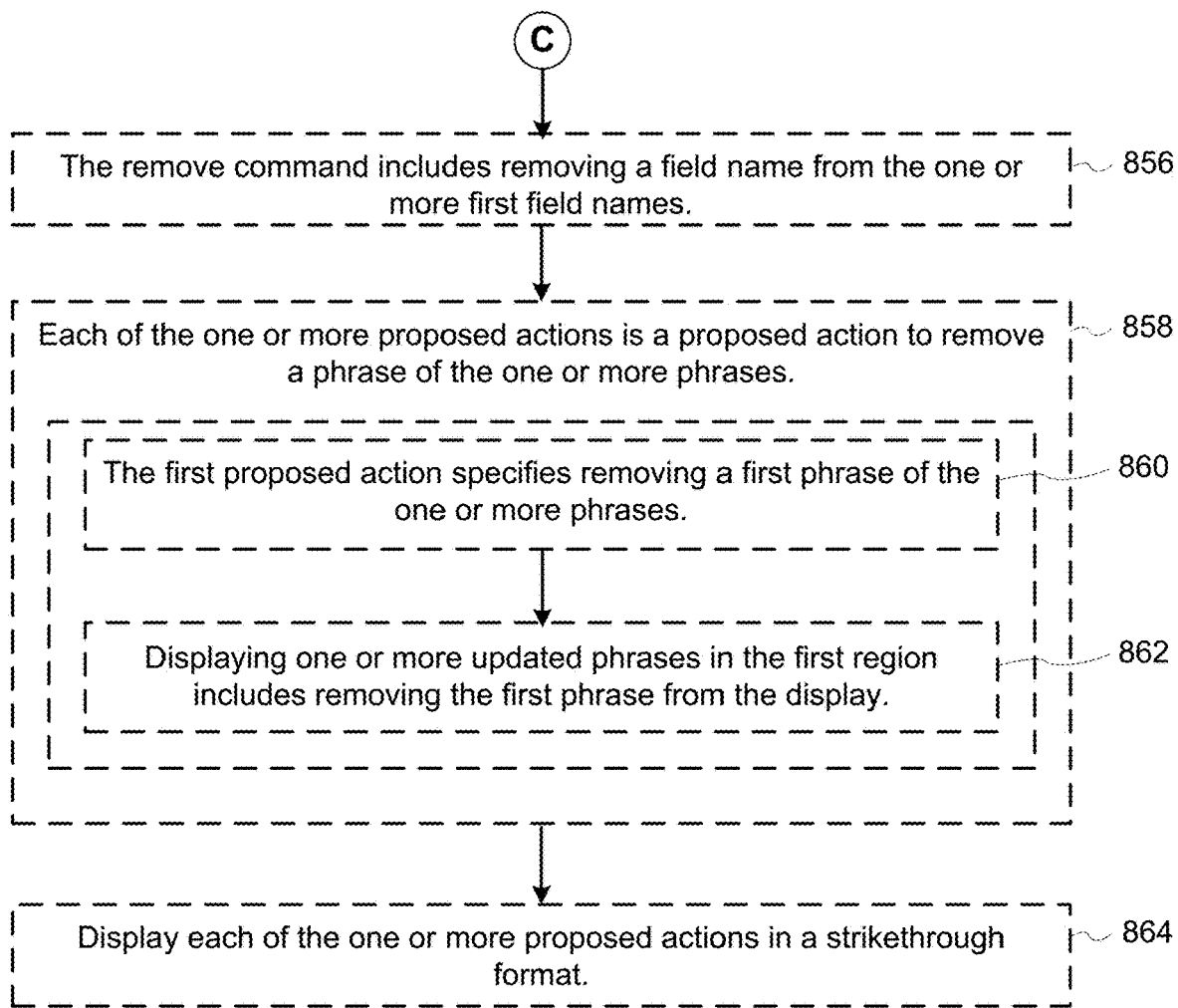

FIG. 7G shows a partial view of another data visualization 736 that is defined by the phrases 738 "'Avg. Sales,' 'average Profit,' and 'by Region.'" The user inputs a natural language command 740 "replace" in the command box 124. In response to the natural language command 712, the graphical user interface 100 displays several interpretations in the dropdown menu, including an interpretation 742 that includes a proposed action to replace "by Region" with "by Category."

FIGS. 8A-8F provide a flowchart of a method 800 for updating (802) visual analysis of datasets according to some implementations. The method 800 is also called a process.

The method 800 is performed (804) at a computing device 200 that has a display 212, one or more processors 202, and memory 206. The memory 206 stores (806) one or more programs configured for execution by the one or more processors 202. In some implementations, the operations shown in FIGS. 3 to 7 correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 800 may be combined and/or the order of some operations may be changed.

The computing device 200 displays (808) a data visualization based on a dataset retrieved from a database 258. For example, the computing device displays the data visualization 330 as illustrated in FIGS. 3C, 4A, 5A, 6A, and 7A.

The computing device 200 displays (810) one or more phrases in a first region in proximity to the displayed data visualization. Each of the one or more phrases includes one or more first field names of data fields in the dataset. The one or more phrases define the data visualization. For example, the computing device displays one or more phrases 320 in the region 322 as illustrated in 3C, 4A, 5A, 6A, and 7A. The phrases 320 include the phrase 320-1 "average Sales" and the phrase 320-2 "average Profit," which define the data visualization 330. The phrase 320-1 "average Sales" includes the field name "Sales." The phrase 320-1 "average Profit" includes the field name "Profit."

In some implementations, the one or more first field names are displayed (812) in a visually distinctive manner from other words included in the one or more phrases. As illustrated in FIGS. 3C, 4A, 5A, 6A, and 7A, the field names "Sales" and "Profit" are in boldface whereas the other words included in the phrases 320 are non-boldface.

The computing device 200 receives (814) user input in a second region, distinct from the first region, to specify a natural language command related to the displayed data visualization. For example, the computing device 200 receives the user input via the command box 124 of the graphical user interface 100. The command box 124 is distinct from the region 322, as illustrated in FIGS. 3 to 7.

In some implementations, the user input is received (816) as text input from a user in the second region. For example, the user may enter (e.g., type in) the text input.

In some implementations, the user input is received (818) as a voice command using a microphone coupled to the computing device. For example, the user may speak an utterance that is captured by the audio input device 220.

In response (820) to the user input, the computing device 200 extracts (822) one or more independent analytic phrases from the natural language command. For example, as described in U.S. patent application Ser. No. 16/166,125, the natural language processing module 236 may parse the natural language command into tokens. The natural language processing module 236 may use a lexicon corresponding to the data source 258 to identify synonyms, aggregation types, and data fields to be aggregated. In some implementations, and as described in U.S. patent application Ser. No. 16/234,470, the data visualization application 230 also includes an inferencing module that is used to resolve underspecified (e.g., omitting information) or ambiguous (e.g., vague) natural language commands into formal queries that can be executed against the data visualization application 230 to generate useful data visualizations.

The computing device 200 determines (824) one or more proposed actions (also referred to as one or more interpretations) based on the extracted analytic phrases.

In some implementations, the one or more determined proposed actions include (826) at least one of: a remove command, an add command, and a replace command. For example, in FIG. 6A, the interpretation 604, if selected, would remove the phrase 320-2 "average Profit" from the phrases 320 that define the data visualization 330. In FIG. 4A, the interpretation 404 "sum of Sales" corresponds to a proposed action to add the phrase "sum of Sales" to the existing phrases 320 that define the data visualization 330. In FIG. 4A, the interpretation 406 corresponds to a proposed action to replace the existing phrase 320-2 "average Profit" of the phrases 320 with a different phrase "sum of Profit."

In some implementation, the one or more proposed actions are displayed (828) as a drop-down menu from the second region. For example, as illustrated in FIG. 4A, the proposed actions are displayed as a dropdown menu 316 from the command box 124

The computing device 200 displays (830) the one or more proposed actions.

In some instances, displaying the one or more proposed actions includes displaying (832) a second proposed action that includes an add command, and includes displaying (834) a third proposed action that includes a replace command. For example, the computing device displays the proposed action 404 to add the phrase "sum of Sales" and displays the proposed action 406 to replace the phrase "average Profit" with a phrase "sum of Profit", as illustrated in FIG. 4A.

The computing device 200 receives (836) user selection of a first proposed action of the one or more proposed actions.

In response (838) to the user selection, the computing device 200 generates (840) an updated data visualization.

In some implementations, generating the updated data visualization includes requerying (842) the database using a set of one or more queries based on the extracted analytic phrases, thereby retrieving an updated dataset.

The computing device 200 then displays (844) the updated data visualization.

The computing device 200 displays (850) one or more updated phrases in the first region. The one or more updated phrases include one or more second field names of data fields in the dataset. The one or more updated phrases define the updated data visualization. For example, the computing device displays the updated phrases 412 in FIG. 4B, the updated phrases 508 in FIG. 5B, and the updated phrase 608 in FIG. 6B.

In some implementations, the first field names and the second field names include (852) a common field name. For example, as shown in FIGS. 5A and 5B, the phrases 320 and the updated phrases 508 include the phrase 320-1 "average Sales".

In some implementations, the method 800 ranks (854) the one or more proposed actions based on at least one of: the closeness of match between the extracted analytical phrases and a canonical representation of an analytical expression; the frequency of usage of a field name based on previous user history; and/or the saliency or weight of a missing term that is inferred from the natural language command. For example, as discussed in U.S. patent application Ser. No. 16/234,470, the natural language processing module 236 may assign canonical representations/forms to analytical expressions to address the problem of proliferation of ambiguous syntactic parses inherent to natural language querying. A closer match between the extracted analytical phrases and the canonical representation of an analytical expression may indicate a lower degree of ambiguity and gives rise to a higher ranking for the proposed action. In some implementations, data attributes and values of data fields affect ranking.

In some instances, the remove command includes removing (856) a field name from the one or more first field names. In some instances, each of the one or more proposed actions is (858) a proposed action to remove a phrase of the one or more phrases. This is illustrated in FIG. 7C.

In some instances, the first proposed action specifies removing (860) a first phrase of the one or more phrases. Displaying one or more updated phrases in the first region includes removing (862) the first phrase from the display. For example, FIG. 7C illustrates user selection of the proposed action 716 to remove "average profit". The transition from FIG. 7C to FIG. 7D illustrates that the phrase 320-2 "average Profit" has been removed from display in the updated phrases 720.

In some instances, the method 800 displays (864) each of the one or more proposed actions in a strikethrough format. This is illustrated in FIG. 7C.

In some instances, the one or more phrases includes (866) one or more analytical concepts. Determining that the one or more proposed actions include an add command and/or a replace command includes determining (868) that the natural language command includes an analytical concept distinct from the one or more analytical concepts. For example, in FIG. 7A, the phrases 320 "average Sales" and "average Profit" include the analytical concept of calculating an average value for data fields having field names "Sales" and "Profit." The natural language command 702 "by Region" includes a concept to group the data by region.

In some instances, each of the analytical concepts is (870) one of: a field/measure (e.g. sum of sales), an aggregation type, a level of detail of an aggregation, a filter (e.g., filter by a numeric quantity, filter by categorical data, or filter by relative dates, such as "last six quarters" or "last five months"), sort (e.g. alphabetically or ascending/descending by a measure), or a calculation over a time range (e.g. a calculation of year-over-year percentage change in sales, or a calculation of month-over-month change in total profits).

In some instances, a remove command specifies (872) removing a predefined expression type. The first proposed action specifies (874) removing phrases of the one or more phrases containing the predefined expression type. Displaying the one or more updated phrases in the first region includes removing (876) from display all phrases of the one or more phrases that contain the predefined expression type. For example, FIGS. 6C and 6D illustrate removing all phrases that contain a filter type. In some implementations, the predefined expression type is one of a limit, a group, an aggregation, a filter, and a sort.

In some instances, a replace command specifies replacement (878) of an aggregation operator with a distinct aggregation operator. Displaying the one or more proposed actions include displaying (880) an option that includes the aggregation operator and the distinct aggregation operator. For example, as illustrated in FIG. 4A, the proposed action 406 includes an action to replace the aggregation operator "average" (e.g., "average Profit") with a distinct aggregation operator "sum" (e.g., "sum of Profit").

In some instances, a replace command specifies replacement (882) of one field name with a distinct field name. Displaying the one or more proposed actions include displaying (884) an option that includes the one field name and the distinct field name. For example, as illustrated in FIG. 7G, the proposed action 742 includes replacing the field name "Region" with a distinct field name "Category."

In some implementation, the data visualization has (846) a first data visualization type and the updated data visualization has a second data visualization type distinct from the first data visualization type. For example, this is illustrated in the transition from FIG. 4A to FIG. 4B, and in the transition from FIG. 6A to FIG. 6B.

In some implementations, the data visualization has (848) a first data visualization type. Displaying an updated data visualization includes displaying a plurality of second data visualizations having the first data visualization type.

In some instances, the add command specifies (886) an operation on a third data field in the dataset. The third data field is distinct from the one or more first data fields. The first proposed action includes (888) the add command. Displaying one or more updated phrases in the first region includes displaying (890) with the one or more phrases an additional phrase that includes a third field name corresponding to the third data field. This is illustrated in FIGS. 7A and 7B. In this example, the add command corresponds to an operation to group the data fields average sales and average profit by region. The field name "Region" is distinct from the field names "sales" and "profit." In FIG. 7B, the computing device displays the updated phrases 708, which includes the phrase 708-1 "by Region".

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for updating visual analysis of datasets, comprising:
   at a computing device having a display, one or more processors, and memory storing one or more programs configured for execution by the one or more processors:
   displaying a data visualization based on data fields of a dataset retrieved from a database;
   displaying, concurrently with the data visualization, a plurality of phrases in a first region in proximity to the data visualization, wherein the plurality of phrases collectively define the data visualization and each of the displayed phrases includes a respective one or more first field names of the data fields in the dataset;
   receiving user input in a natural language command input region to specify a natural language command related to the displayed data visualization, wherein the natural language command input region is distinct from the first region;
   in response to the user input:
      determining that the natural language command includes a metacommand to: (1) add a data field to the data visualization, or (2) remove a data field from the data visualization, or (3) replace a data field in the data visualization with another data field;
      determining one or more proposed actions in accordance with the determined metacommand;
      for each of the one or more proposed actions, generating one or more respective phrases corresponding to the respective proposed action;
      ranking the one or more proposed actions based on a saliency or weight of a missing term that is inferred from the natural language command according to one or more inferencing rules based on syntactic constraints imposed by a context-free grammar and semantic constraints imposed by attributes of the data fields of the dataset; and
      displaying the ranked one or more proposed actions in a dropdown menu adjacent to the natural language command input region;
   receiving user selection of a first proposed action of the ranked one or more proposed actions; and
   in response to the user selection of the first proposed action:
      generating an updated data visualization in accordance with the first proposed action;
      determining one or more updated phrases corresponding to the first proposed action, wherein the one or more updated phrases collectively define the updated data visualization and include one or more second field names of data fields in the dataset;
      displaying the updated data visualization; and
      displaying the one or more updated phrases concurrently with the updated data visualization, in the first region.

2. The method of claim 1, wherein the first field names and the second field names include a common field name.

3. The method of claim 1, wherein the one or more first field names are displayed in a visually distinctive manner from other words included in the one or more phrases.

4. The method of claim 1, wherein the natural language command includes a metacommand to remove a data field from the data visualization; and
- the one or more proposed actions include a proposed action to remove a first phrase, of the plurality of phrases, containing a field name of the data field.

5. The method of claim 4, further comprising displaying the proposed action to remove the first phrase in a strike-through format.

6. The method of claim 4, wherein the first proposed action includes removing the first phrase; and
- displaying the one or more updated phrases includes removing the first phrase from display in the first region.

7. The method of claim 1, wherein the plurality of phrases includes a first phrase having a first analytical concept; and
- the one or more proposed actions include a second analytical concept distinct from the first analytical concept.

8. The method of claim 7, wherein each of the first and second analytical concepts is selected from the group consisting of: a field/measure, an aggregation type, a level of detail of an aggregation, a filter, a sort, and a calculation over a time range.

9. The method of claim 1, wherein the natural language command includes a metacommand to remove a filter expression containing a specified data field, and the method further comprises:
- identifying a first phrase, from the plurality of phrases, that is a filter expression containing the specified data field; and
- the one or more proposed actions include a proposed action to remove the first phrase, while retaining one or more of the plurality of phrases, containing the specified data field, that are not filter expressions.

10. The method of claim 1, wherein the natural language command includes a command to replace a first aggregation operator for a first data field with a second different aggregation operator; and
- displaying the one or more proposed actions includes displaying a proposed action that includes a first text string and a second text string, wherein the first text string includes the first data field and the first aggregation operator, the second text string includes the first data field and the second aggregation operator, and the first text string is visually distinguished from the second text string.

11. The method of claim 1, wherein the natural language command further specifies replacement of one field name with a distinct field name; and
- displaying one or more proposed actions include displaying a proposed action that includes the one field name and the distinct field name.

12. The method of claim 1, wherein displaying the one or more proposed actions includes:
- displaying a second proposed action that includes an add command; and
- displaying a third proposed action that includes a replace command.

13. The method of claim 1, wherein generating the updated data visualization includes requerying the database using a set of one or more queries based on the updated phrases, thereby retrieving an updated dataset.

14. The method of claim 1, wherein the data visualization has a first data visualization type and the updated data visualization has a second data visualization type distinct from the first data visualization type.

15. The method of claim 1, wherein the data visualization has a first data visualization type; and
- displaying an updated data visualization includes displaying a plurality of second data visualizations each having the first data visualization type.

16. The method of claim 1, further comprising ranking the one or more proposed actions based on a frequency of usage of a field name based on previous user history.

17. A computing device, comprising:
- one or more processors;
- memory coupled to the one or more processors;
- a display; and
- one or more programs stored in the memory and configured for execution by the one or more processors, the one or more programs comprising instructions for:
  - displaying a data visualization based on data fields of a dataset retrieved from a database;
  - displaying, concurrently with the data visualization, a plurality of phrases in a first region in proximity to the data visualization, wherein the plurality of phrases collectively define the data visualization and each of the displayed phrases includes a respective one or more first field names of the data fields in the dataset;
  - receiving user input in a natural language command input region to specify a natural language command related to the displayed data visualization, wherein the natural language command input region is distinct from the first region;
  - in response to the user input:
    - determining that the natural language command includes a metacommand to: (1) add a data field to the data visualization, or (2) remove a data field from the data visualization, or (3) replace a data field in the data visualization with another data field;
    - determining one or more proposed actions in accordance with the determined metacommand;
    - for each of the one or more proposed actions, generating one or more respective phrases corresponding to the respective proposed action;
    - ranking the one or more proposed actions based on a saliency or weight of a missing term that is inferred from the natural language command according to one or more inferencing rules based on syntactic constraints imposed by a context-free grammar and semantic constraints imposed by attributes of the data fields of the dataset, and
    - displaying the ranked one or more proposed actions in a dropdown menu adjacent to the natural language command input region;
  - receiving user selection of a first proposed action of the ranked one or more proposed actions; and
  - in response to the user selection of the first proposed action:
    - generating an updated data visualization in accordance with the first proposed action;
    - determining one or more updated phrases corresponding to the first proposed action, wherein the one or more updated phrases collectively define the updated data visualization and include one or more second field names of data fields in the dataset;

displaying the updated data visualization; and displaying the one or more updated phrases concurrently with the updated data visualization, in the first region.

18. A non-transitory computer readable storage medium storing one or more programs, the one or more programs comprising instructions, which when executed by a computing device, cause the device to perform the method of:

displaying a data visualization based on data fields of a dataset retrieved from a database;

displaying, concurrently with the data visualization, a plurality of phrases in a first region in proximity to the data visualization, wherein the plurality of phrases collectively define the data visualization and each of the displayed phrases includes a respective one or more first field names of the data fields in the dataset;

receiving user input in a natural language command input region to specify a natural language command related to the displayed data visualization, wherein the natural language command input region is distinct from the first region;

in response to the user input:

determining that the natural language command includes a metacommand to: (1) add a data field to the data visualization, or (2) remove a data field from the data visualization, or (3) replace a data field in the data visualization with another data field;

determining one or more proposed actions in accordance with the determined metacommand;

for each of the one or more proposed actions, generating one or more respective phrases corresponding to the respective proposed action;

ranking the one or more proposed actions based on a saliency or weight of a missing term that is inferred from the natural language command according to one or more inferencing rules based on syntactic constraints imposed by a context-free grammar and semantic constraints imposed by attributes of the data fields of the dataset, and displaying the one or more proposed actions in a dropdown menu adjacent to the natural language command input region;

receiving user selection of a first proposed action of the one or more proposed actions; and in response to the user selection of the first proposed action:

generating an updated data visualization in accordance with the first proposed action;

determining one or more updated phrases corresponding to the first proposed action, wherein the one or more updated phrases collectively define the updated data visualization and include one or more second field names of data fields in the dataset;

displaying the updated data visualization; and displaying the one or more updated phrases concurrently with the updated data visualization, in the first region.

19. The method of claim 1, wherein the plurality of phrases is displayed as a plurality of distinct entities in the first region.

20. The method of claim 19, wherein each entity of the plurality of entities is separated from respective adjacent entities in the first region by a comma and/or a conjunction.

* * * * *